US009201999B1

(12) United States Patent
Sahni

(10) Patent No.: US 9,201,999 B1
(45) Date of Patent: Dec. 1, 2015

(54) INTEGRATED CIRCUIT FLOORPLAN HAVING FEEDTHROUGH BUFFERS

(71) Applicant: Cadence Design Systems, Inc., San Jose, CA (US)

(72) Inventor: Prakash Sahni, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/501,462

(22) Filed: Sep. 30, 2014

Related U.S. Application Data

(60) Provisional application No. 62/019,408, filed on Jun. 30, 2014.

(51) Int. Cl.
*G06F 17/50* (2006.01)

(52) U.S. Cl.
CPC ........ *G06F 17/5072* (2013.01); *G06F 17/5081* (2013.01); *G06F 2217/06* (2013.01)

(58) Field of Classification Search
CPC ............ G06F 17/5072; G06F 17/5081; G06F 2217/06
See application file for complete search history.

(56) References Cited

U.S. PATENT DOCUMENTS

| | | | | | |
|---|---|---|---|---|---|
| 5,313,615 | A | * | 5/1994 | Newman et al. | 716/139 |
| 5,473,546 | A | * | 12/1995 | Filseth | 716/103 |
| 5,659,716 | A | * | 8/1997 | Selvidge et al. | 703/23 |
| 6,135,647 | A | * | 10/2000 | Balakrishnan et al. | 716/102 |
| 6,421,818 | B1 | * | 7/2002 | Dupenloup et al. | 716/105 |
| 6,651,232 | B1 | * | 11/2003 | Pileggi et al. | 716/114 |
| 6,857,110 | B1 | * | 2/2005 | Rupp et al. | 716/136 |
| 6,952,816 | B2 | * | 10/2005 | Gupta et al. | 716/103 |
| 6,958,545 | B2 | * | 10/2005 | Kotecha et al. | 257/758 |
| 7,103,863 | B2 | * | 9/2006 | Riepe et al. | 716/113 |
| 7,178,112 | B1 | * | 2/2007 | Ciolfi et al. | 703/2 |
| 7,237,214 | B1 | * | 6/2007 | Pandey et al. | 716/131 |
| 7,330,808 | B1 | * | 2/2008 | Jorgensen et al. | 703/14 |
| 7,937,677 | B2 | * | 5/2011 | Chien et al. | 716/103 |
| 7,954,078 | B1 | * | 5/2011 | Wang et al. | 716/127 |
| 8,095,903 | B2 | * | 1/2012 | Birch et al. | 716/126 |
| 8,464,196 | B1 | * | 6/2013 | Lawson et al. | 716/126 |
| 8,549,447 | B2 | * | 10/2013 | Eisenstadt | 716/100 |
| 8,719,752 | B1 | * | 5/2014 | Ye et al. | 716/115 |
| 8,806,407 | B2 | * | 8/2014 | Yu | 716/130 |
| 2001/0038612 | A1 | * | 11/2001 | Vaughn et al. | 370/256 |
| 2006/0265205 | A1 | * | 11/2006 | Weiss et al. | 703/13 |

* cited by examiner

*Primary Examiner* — Naum B Levin

(74) *Attorney, Agent, or Firm* — Schwegman Lundberg & Woessner, P.A.

(57) ABSTRACT

A method and a system are provided for planning feedthrough ports on a floorplan for an integrated circuit. In one example, the system groups paths (e.g., nets) into mutually exclusive families of paths (e.g., nets). The system analyzes the simpler path combinations for each path family. Advantageously, the system can find consistent design solutions for paths (e.g., nets), while adding fewer ports and fewer nets, within a practical amount of time.

20 Claims, 21 Drawing Sheets netlist
300B

```
module modA (out);
output out;
BUFX2 src(.A(),.Y(out));
endmodule

module modB ();
endmodule

module modC (in);
input in;
BUFX2 sink(.A(in),.Y());
endmodule

module modTop ();
wire net;
modA A(.out(net));
modB B();
modC C(.in(net));
endmodule
```

325

327

329

331

FIG. 3B netlist
300C

```
module modA (
      out);
   output out;

   BUFX2 src (.Y(out),
      .A());
endmodule

module modB (
      ftp_0_0_000_49_590_net,
      ftp_0_100_000_49_590_net);
   input ftp_0_0_000_49_590_net;
   output ftp_0_100_000_49_590_net;

   BUFX2 ftbuf_0 (.Y(ftp_0_100_000_49_590_net),
      .A(ftp_0_0_000_49_590_net));
endmodule

module modC (
      in);
   input in;

   BUFX2 sink (.Y(),
      .A(in));
endmodule

module modTop ();

   // Internal wires
   wire ftnet_1;
   wire net;

   modA A (.out(net));
   modB B (.ftp_0_0_000_49_590_net(net),
      .ftp_0_100_000_49_590_net(ftnet_1));
   modC C (.in(ftnet_1));
endmodule
```

340

345

FIG. 3C netlist
400B

```
module modTop ();
wire net1,net2;

modA A1(.out(net1));
modA A2(.out(net2));
modB B1;
modB B2;
modC C1(.in(net1));
modC C2(.in(net2));
endmodule

module modA (out);
output out;
BUFX2 src(.A(),.Y(out));
endmodule

module modB ();
endmodule

module modC (in);
input in;
BUFX2 sink(.A(in),.Y());
endmodule
```

445

447

449

451

FIG. 4B netlist
400C

```
module modA (
      out);
   output out;

   BUFX2 src (.Y(out),
      .A());
endmodule

module modB (
      ftp_0_0_000_49_590,
      ftp_0_100_000_49_590);
   input ftp_0_0_000_49_590;
   output ftp_0_100_000_49_590;

   BUFX2 ftbuf_0 (.Y(ftp_0_100_000_49_590),
      .A(ftp_0_0_000_49_590));
endmodule

module modC (
      in);
   input in;

   BUFX2 sink (.Y(),
      .A(in));
endmodule

module modTop ();

   // Internal wires
   wire ftnet_3;
   wire ftnet_1;
   wire net1;
   wire net2;

   modA A1 (.out(net1));
   modA A2 (.out(net2));
   modB B1 (.ftp_0_0_000_49_590(net1),
      .ftp_0_100_000_49_590(ftnet_1));
   modB B2 (.ftp_0_0_000_49_590(net2),
      .ftp_0_100_000_49_590(ftnet_3));
   modC C1 (.in(ftnet_1));
   modC C2 (.in(ftnet_3));
endmodule
```

465

467

FIG. 4C netlist
500B

```
module modA (out);          } 535
BUFX2 src(.Y(out));
output out;
endmodule
module modB ();             } 537
endmodule
module modC (in);
input in;                   } 539
BUFX2 sink(.A(in));
endmodule
module modD ();             } 541
endmodule
module modTop ();
wire net1,net2;
modA A1(.out(net1));
modA A2(.out(net2));
modB B1;
modB B2;                    } 543
modC C1(.in(net1));
modC C2(.in(net2));
modD D1;
modD D2;
endmodule
```

FIG. 5B netlist
500C

```
module modA (     out);
    output out;
    BUFX2 src (.Y(out));
endmodule

module modB ();
endmodule

module modC (in);
    input in;
    BUFX2 sink (.A(in));
endmodule

module modD (
      ftp_0_100_000_200_070,
      ftp_0_200_000_100_035);
    input ftp_0_100_000_200_070;
    output ftp_0_200_000_100_035;

    BUFX2 ftbuf_0 (.Y(ftp_0_200_000_100_035),
       .A(ftp_0_100_000_200_070));
endmodule

module modTop ();
    // Internal wires
    wire ftnet_3;
    wire ftnet_1;
    wire net1;
    wire net2;

    modA A1 (.out(net1));
    modA A2 (.out(net2));
    modB B1 ();
    modB B2 ();
    modC C1 (.in(ftnet_1));
    modC C2 (.in(ftnet_3));
    modD D1 (.ftp_0_100_000_200_070(net1),
       .ftp_0_200_000_100_035(ftnet_1));
    modD D2 (.ftp_0_100_000_200_070(net2),
       .ftp_0_200_000_100_035(ftnet_3));
endmodule
```

} 565

} 567

FIG. 5C netlist
600B

```
module modA (out);
output out;
BUFX2 src(.A(),.Y(out));
endmodule

module modB (in);
input in;
BUFX2 sink(.A(in),.Y());
endmodule

module modC (in);
input in;
BUFX2 sink(.A(in),.Y());
endmodule

module modTop ();
wire net;
modA A(.out(net));
modB B(.in(net));
modC C(.in(net));
endmodule
```

635
637
639
641

FIG. 6B netlist
600C

```
module modA (
       out,
       ftp_0_100_000_50_000);
   output out;
   output ftp_0_100_000_50_000;

   BUFX2 ftbuf_0(.Y(ftp_0_100_000_50_000),  .A(out));
   BUFX2 src (.Y(out),  .A());
endmodule

module modB (      in);
   input in;
   BUFX2 sink (.Y(),     .A(in));
endmodule

module modC (      in);
   input in;
   BUFX2 sink (.Y(),     .A(in));
endmodule

module modTop ();
   // Internal wires
   wire ftnet_0;
   wire net;

   modA A (.out(net),
      . ftp_0_100_000_50_000 (ftnet_0));
   modB B (.in(net));
   modC C (.in(ftnet_0));
endmodule
```

INTEGRATED CIRCUIT FLOORPLAN HAVING FEEDTHROUGH BUFFERS

CROSS REFERENCE

The patent application claims the benefit of U.S. Provisional Patent Application No. 62/019,408 entitled INTEGRATED CIRCUIT FLOORPLAN HAVING FEEDTHROUGH PORTS filed on Jun. 30, 2014 by inventor Prakash Sahni.

FIELD

The embodiments of the invention relate generally to planning an integrated circuit floorplan having feedthrough ports.

BACKGROUND

Hierarchical physical implementation of digital integrated circuits involves partitioning a full netlist of the integrated circuit into partitions (e.g., modules) that will be physically implemented separately. A top-level design team gives each partition a fixed physical boundary. The top-level design team assigns each partition to a lower-level physical design team, which physically designs the given partition.

Each physical design team is constrained. Only the instances (e.g., cells) and the nets (e.g., wires) that belong to the partition's netlist can be placed and routed inside the partition's boundary. In a channel-less floorplan the partitions have boundaries which are fully abutted with the neighboring partitions or the die. Fully abutted means there are no routing resources available (e.g., no channels) between partitions to implement the "top" nets. The top nets are the nets that are not logically contained inside any single partition.

Accordingly, the top-level design team must coordinate the efforts of the individual physical design teams. Although the individual physical design teams are tasked with designing a given partition, the partitions are connected and communicate to advance the overall objectives of the integrated circuit. Where there is a channel-less floorplan with fully abutted neighboring partitions, the top-level design team coordinates the proper connections between partitions.

A challenge for the top-level design team is making sure that the logical design of the integrated circuit can be implemented properly in the physical design of the integrated circuit. For example, the logical design needs to be translated into proper port connections between abutting modules, which the physical design teams will implement. There are many port connections that need to be coordinated correctly. Such a task can be tedious and time-consuming and is further complicated when there are multiple identical instantiations of the partitions.

BRIEF SUMMARY

The embodiments of the invention are best summarized by the claims that follow below. However, briefly, a method and system for planning feedthrough ports for modules in a floorplan are described. The system groups paths (e.g., nets) into mutually exclusive families of paths (e.g., nets) and tries out the simpler path combinations for each family. Advantageously, the system can find consistent design solutions for paths (e.g., nets), while adding fewer ports and nets, within a practical amount of time.

BRIEF DESCRIPTIONS OF THE DRAWINGS

Various embodiments of the present invention taught herein are illustrated by way of example, and not by way of limitation, in the figures of the accompanying drawings, in which:

FIG. 3B is an example netlist for the floorplan before feedthrough ports are added to module B of FIG. 3A.

FIG. 3C is an example netlist for the floorplan after feedthrough ports are added to module B of FIG. 3A.

FIG. 4B is an example netlist for the floorplan before feedthrough ports are added to module B (for instantiations B1 and B2) of FIG. 4A.

FIG. 4C is an example netlist for the floorplan after feedthrough ports are added to module B of FIG. 4A.

FIG. 5B is an example netlist for the floorplan before feedthrough ports are added to an intermediate module (e.g., module B or module D) of FIG. 5A.

FIG. 5C is an example netlist for the floorplan after feedthrough ports are added to module D of FIG. 5A.

FIG. 6B is an example netlist for the floorplan before a feedthrough port is added to module A of FIG. 6A.

FIG. 6C is an example netlist for the floorplan after a feedthrough port is added to module A of FIG. 6A.

Figure 1A:
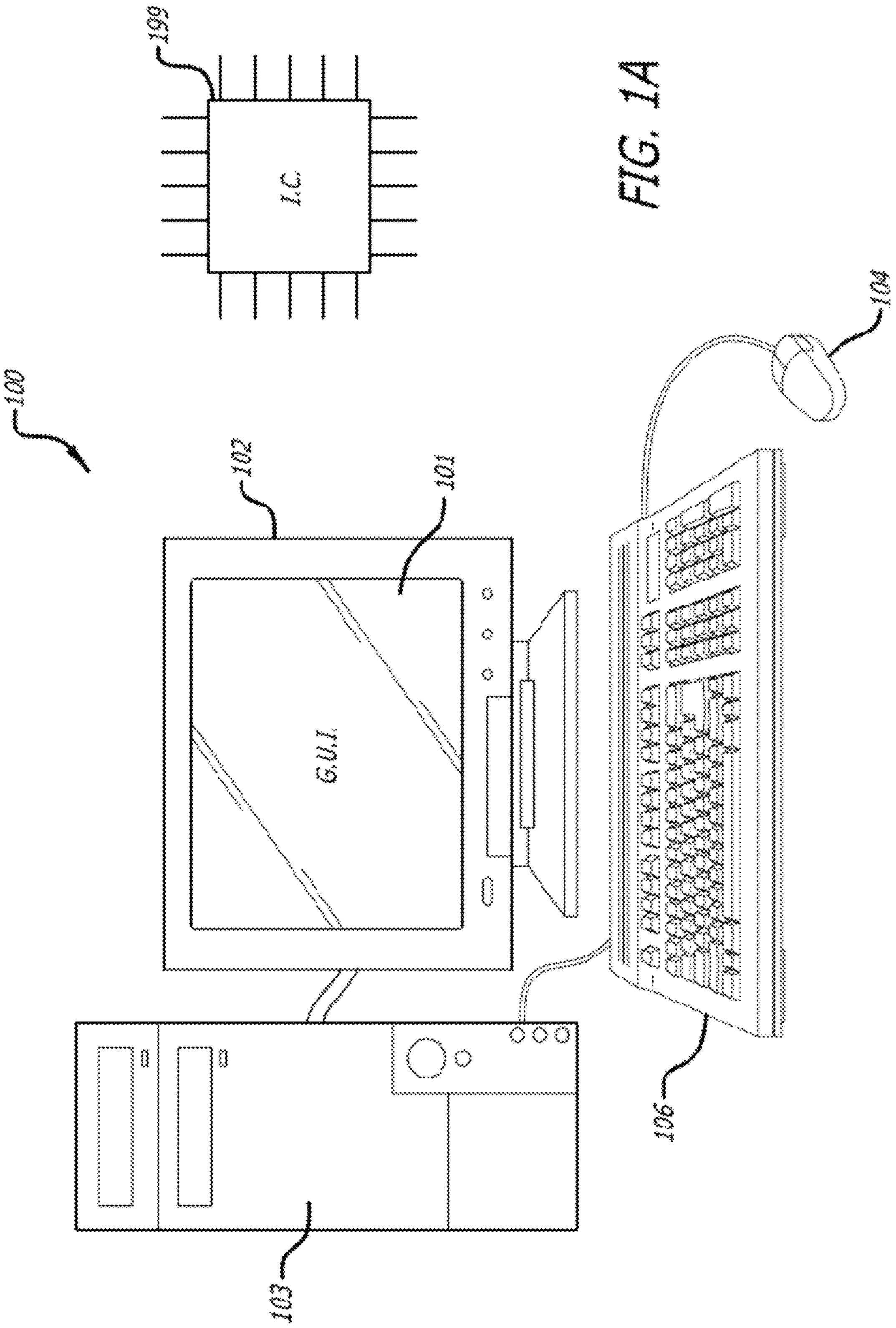
FIG. 1A illustrates a computer system for designing an integrated circuit.

It will be recognized that some or all of the Figures are for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

INTRODUCTION

The embodiments of the invention include a method and system for planning feedthrough ports for modules on a floorplan. There can be many instantiations of each module and a multitude of nets for connection between modules. Each module can include multiple ports (e.g., pins). Many of the modules may be abutting (e.g., without space between modules). The top-level team directs the system to perform channel-less routing between abutting modules.

A top-level design team coordinates the planning of the channel-less routing between modules. Where modules are abutting each other, the top-level design team often needs to plan feedthrough ports to pass through an intermediate module. Each module may then be provided to a different physical design team, which has limited or no flexibility to change module boundaries or ports. Without top-level management, physical design team for an intermediate module would not know about a net that needs to pass through the intermediate module to connect adjacent modules. If the top-level team fails to plan a necessarily net through an intermediate module, then the physical design teams would not be able to route the necessary net because the modules are abutting.

Accordingly, it is important for the top-level team to design ports, nets, and/or feedthrough ports to be logically correct. Otherwise, it will be practically infeasible for each physical design team to design a module that is physically operable. However, there are a multitude of possible net combinations between ports on abutting modules. By using traditional design methods, it would take an unduly large amount of time for the top-level team to design a consistent combination of port location (e.g., pin locations) for the entire floorplan.

Accordingly, by using systems and methods provided in this description, the top-level team directs the system to plan feedthrough ports. The system groups paths (e.g., nets) into mutually exclusive families of paths (e.g., nets). The system tries out the simpler path combinations for each family. Advantageously, the system can find consistent design solutions for paths (e.g., nets), while adding fewer ports and fewer nets, within a practical amount of time.

Floorplanning within Context of Integrated Circuit Design

Figure 2:
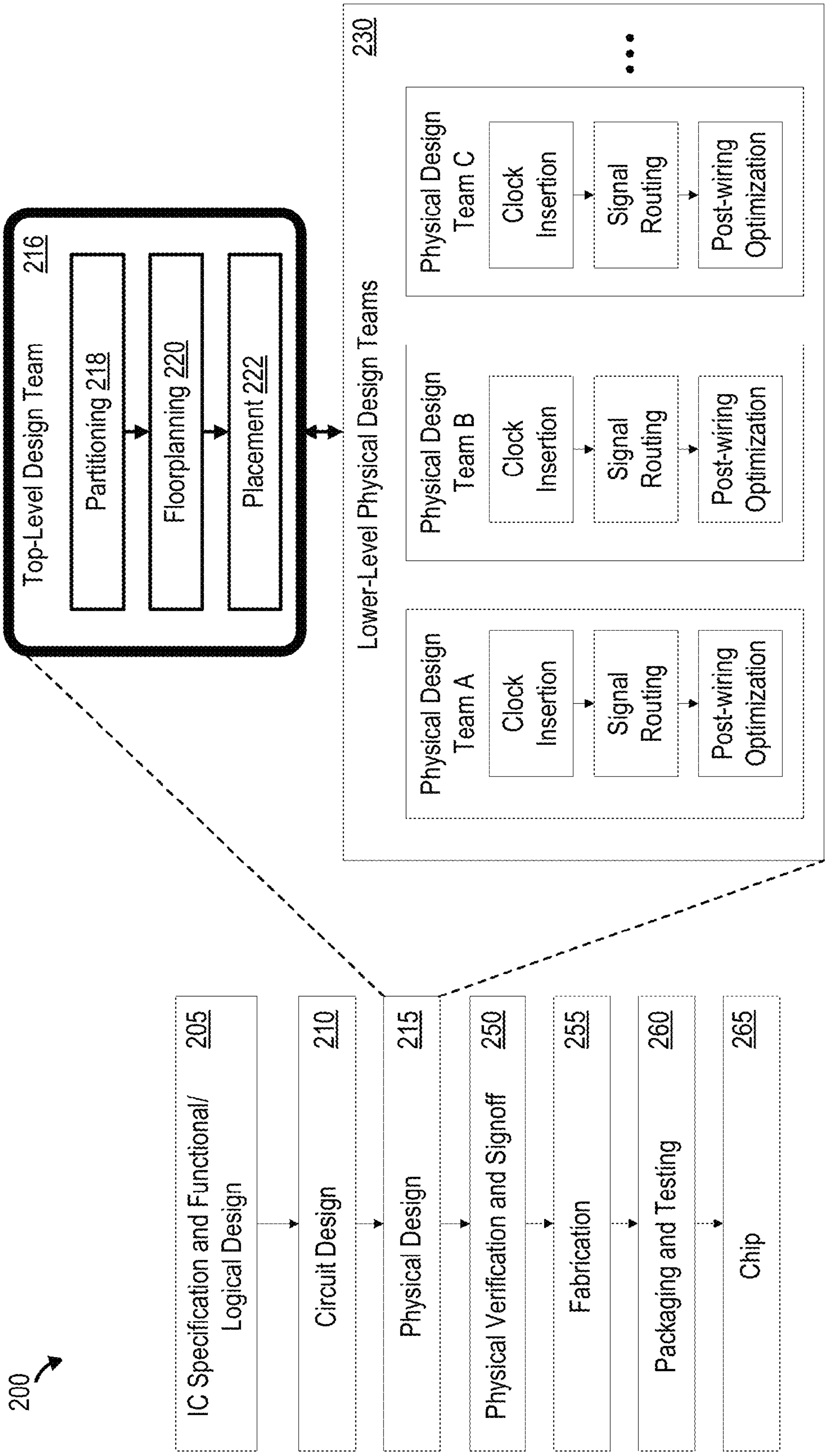
FIG. 2 is a block diagram of an integrated circuit (IC) design cycle.

FIG. 2 is a block diagram of an integrated circuit (IC) design cycle 200. The IC design cycle 200 includes the following stages: IC specification and functional/logical design 205, circuit design 210, physical design, physical verification and signoff 250, fabrication 255, packaging and testing 260, and chip 265.

In IC specification and functional/logical design 205, the system generates the functional specification. The system may use a variety of languages and tools to generate this description. Examples include a C/C++ model, SystemC, SystemVerilog Transaction Level Models, Simulink and MATLAB.

Circuit design 210 includes converting the user specification (e.g., what the user wants the chip to do) into a register transfer level (RTL) description. The RTL describes the exact behavior of the digital circuits on the chip, as well as the interconnections to inputs and outputs. RTL design, is responsible for the chip performing in the correct manner.

Physical design 215 including mapping the RTL into a gate-level netlist in the target technology of the IC chip. This mapping involves figuring out which gates to use, defining places for them, and wiring the gates together. Physical design does not affect the functionality (if done correctly) but determines how fast the chip operates and how much the chip costs.

Physical design 215 can be divided into two categories of design teams: a top-level design team 216 and multiple lower-level physical design teams 230. The top-level design team 216 performs partitioning 218, floorplanning 220, and placement 222.

Partitioning 218 involves the top-level design team 216 directing the system to divide the chip design into small blocks (e.g., modules). The system performs partitioning mainly to separate different functional blocks and also to make placement and routing easier. Alternatively, the system performs partitioning during circuit design 210 (e.g., RTL design stage) where the design engineer partitions the entire design into sub-blocks and then proceeds to design each module. These modules are linked together in the main module, which may be referred to as the "top level module". This kind of partitioning may be referred to as "logical partitioning".

Floorplanning 220 involves the top-level design team 216 directing the system to identify modules that should be placed close together and allocating space for the modules. The top-level design team 216 assigns the RTL of the chip to modules (e.g., gross regions of the chip) and assigns input/output (I/O) pins to the modules.

Floorplanning is performed to meet the sometimes conflicting goals of available space (e.g., cost of the chip), required performance, and the desire to have everything close to everything else. Based on the area of the design and the hierarchy, the top-level design team 216 decides upon a suitable floorplan. Floorplanning takes into account the macros used in the design, memory, other intellectual property (IP) cores, placement needs, the routing possibilities, and also the area of the entire design. Floorplanning also defines the input-output (10) structure (e.g., placement of ports on the modules) and aspect ratio of the design. A bad floorplan will lead to wasted die area and routing congestion.

Placement 222 involves the top-level design team 216 placing large objects (modules, arrays, cores, etc.) on the floorplan. The top-level design team 216 assigns the gate-level netlist to non-overlapping locations on the chip area, and performs iterative logical and placement transformations to close performance and power constraints. The top-level design team then 216 then assigns each large object (e.g., each module) to a lower-level physical design teams 230, such as physical design team A, physical design team B, physical design team C, or another physical design team.

Each lower-level physical design team 230 may perform clock insertion, signal routing, and post-wiring optimization, among other operations. Clock insertion involves the lower-level physical design team 230 introducing clock signal wiring (e.g., clock tree synthesis) into the design. Signal routing involves adding the wires the wires that connect the gates in the netlist. Postwiring optimization involves checking performance (e.g., timing closure), analyzing noise (e.g., checking signal integrity), and designing for manufacturability (e.g., removing yield violations). Designing for manufacturability involves modifying the design, where possible, to make it as easy and efficient as possible to produce. This may be achieved by adding, for example, extra vias or dummy metal/diffusion/poly layers wherever possible while complying with the design rules set by the manufacturer.

In practice there is not a straightforward progression for physical design. Considerable iteration is required to ensure all objectives are met simultaneously.

The IC design cycle 200 continues with physical verification and signoff 250. Since errors are expensive, time consuming and hard to spot, extensive error checking is the rule, making sure the mapping to logic was done correctly, and checking that the manufacturing rules were followed faithfully.

Next, in fabrication 255, the designers perform tapeout and mask generation. The designers turn the design data into photomasks for mask data preparation. The manufacturer then performs packaging and testing 260 on the chip 265.

Overview of Feedthrough Ports

In a channel-less floorplan design where partitions (e.g., modules) are abutted next to each other, there are limited routing resources. The abutting leads to shorter interconnect distances, less routing resources to be used, faster end-to-end signal paths, and even faster and more consistent place and route times. However, port placement (e.g., pin placement) is a challenging task for modules that abut each other. Where a module needs to make a connection with another module, the top-level design team directs the system to insert feedthrough ports that crosses an intermediate module in order to enable the connection. In another embodiment, one or more additional ports need to be added to the driver module.

Feedthrough port insertion includes identifying paths for the top nets (e.g., wires) and generating logical feedthroughs across intermediate partitions. A logical feedthrough includes an input port connected to one or more output ports via buffer(s) and/or net(s). In case the output ports are to be added to the driver module then an input port is not needed, as the driver port is inside the driver module. The ports are externally connected to the top nets. Several new top nets may be created. This process must retain the electrical connectivity from the source (e.g., driver) to the one or more sinks (e.g., receivers) as in the original netlist.

Figure 3A:
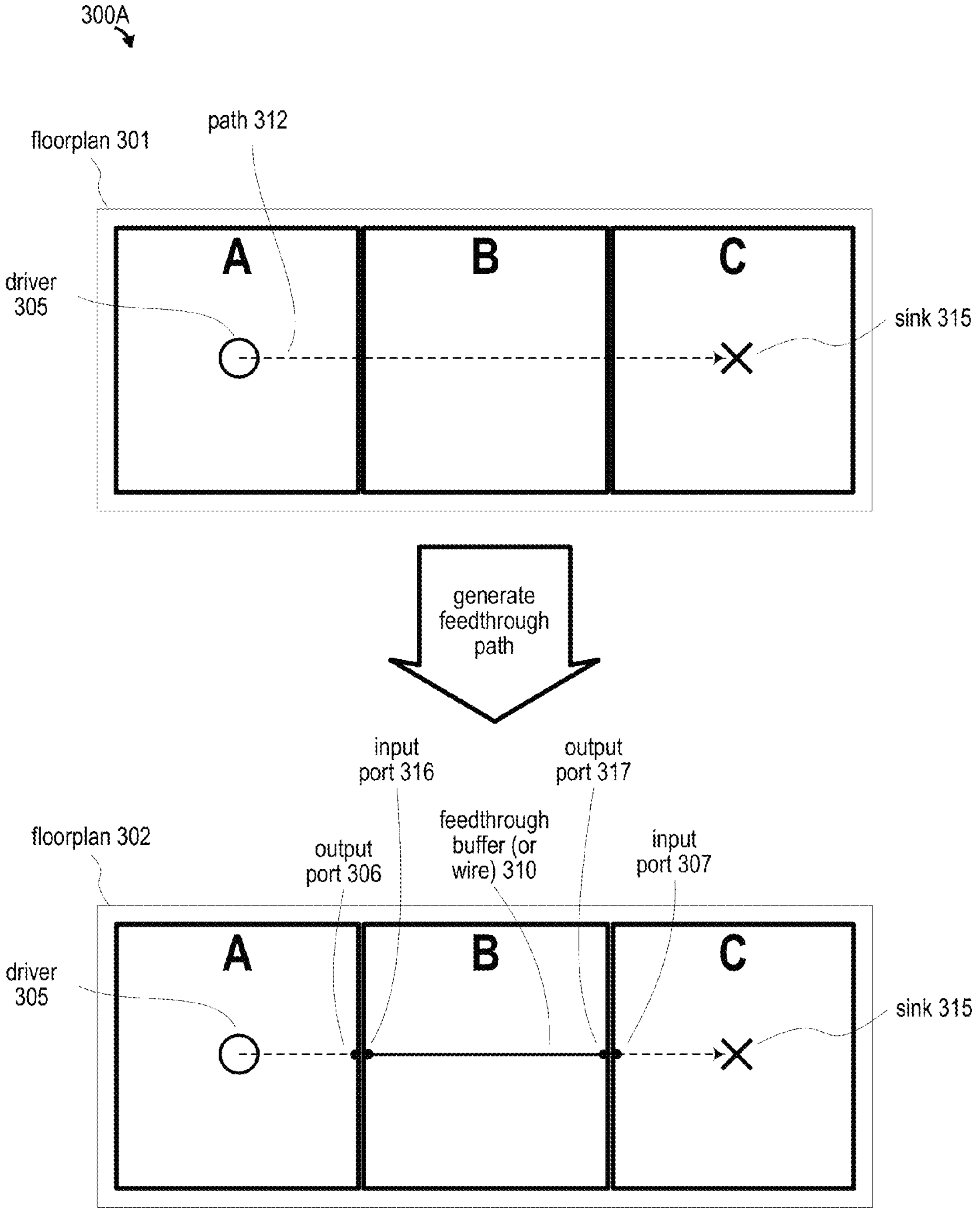
FIG. 3A is a conceptual diagram illustrating feedthrough port insertion on a floorplan, which includes a module A, a module B, and a module C.

FIG. 3A is a conceptual diagram illustrating feedthrough port insertion 300A on a floorplan 301, which includes a module A, a module B, and a module C. The top-level design team 216 has designed the modules to be placed from left to right. Module A is abutted next to module B, which is abutted next to module C. Module B is positioned between module A and module C. The specifications of these modules are for explanatory purposes. In another floorplan, for example, the modules may be sized differently and/or placed in isolation without being abutted.

The top-level design team 216 directs the system to identify a driver-sink pair, such as driver 305 on module A paired with sink 315 on module C. Driver 305 is a source component that is designed to transmit signals to the sink 315, which is a receiver component. Because module B is an intermediate module between modules A and C, the top-level design team 216 desires to design a transmission route through module B. To design the transmission route, the top-level design team 216 uses the system to figure out an appropriate location of ports to be placed on the boundaries of the modules.

In one embodiment, the system identifies a path that extends from module A, through module B, and to module C. As shown in FIG. 3A, the system extends a path 312 from the center of module A, through module B, and to module C. In one embodiment, path 312 includes an air-line that represents a linear path between driver 305 on module A and sink 315 on module C. The system can use the path 312 to identify viable locations for ports on module A, module B, and module C. The system identifies the locations at which the path 312 crosses the each module boundary.

Based on where the path 312 crosses each module boundary, the system can begin operations for generating a feedthrough buffer (or wire) 310 on module B, input port 316 on module B, and output port 317 on module B. Output port 306 on module A and input port 307 on module C exist in the original netlist. The system identifies possible positions for output port 306 on module A, input port 216 on module B, output port 317 on module B, and input port 307 on module C. Each port may include a pin terminal to enable connection of wire and/or other components to complete the electrical path between driver 305 and sink 315. Accordingly, output port 306 on module A is electrically connected to input port 316 on module B. Output port 317 on module B is electrically connected to input port 307 on module C.

The system then generates a feedthrough buffer (or wire) 310 that electrically couples input port 316 on module B with output port 317 on module B. In one embodiment, the feedthrough buffer (or wire) 310 can be replaced by a a net (e.g., wire) that enables signal transmission between input port 316 and output port 317. The feedthrough buffer (or wire) 310 may also include other electronic components, such as inverters in series for example. Accordingly, through the feedthrough buffer (or wire) 310, the driver 305 on module A can carry out signal transmissions with sink 315 on module C.

The top-level design team 216 provides the floorplan 302 to the individual physical teams. As further described below with reference to FIGS. 3B and 3C, the floorplan 302 can be represented as a netlist that is written in a hardware description language (HDL).

FIG. 3B is an example netlist 300B for the floorplan 302 before a feedthrough buffer is added to module B of FIG. 3A. Netlist 300B is written in a hardware description language (HDL).

Netlist 300B defines ports, among other things. For example, code portion 325 defines module A as having an output port. Code portion 327 shows module B as currently having a null set, meaning module B currently does not include any ports. Code portion 329 defines module C as having an input port.

Netlist 300B also defines top nets (e.g., wires) for the modules. For example, code portion 331 defines module A as including a net that is ready to be connected to an output port on module A. Module B has null set, for example, no net. Module C includes a net that is ready to be connected to an input port on module C.

FIG. 3C is an example netlist 300C for the floorplan 302 after a feedthrough buffer is added to module B of FIG. 3A. Netlist 300C includes a modification of the HDL of netlist 300B of FIG. 3B. By modifying the HDL of netlist 300B of FIG. 3B, the top-level design team 216 directs the system to generate a feedthrough buffer (or wire) 310 (e.g., ports and nets) on module B.

As shown in FIG. 3C, code portion 340 defines input port 316 on module B as "ftp_0_0_000_49_590_net", which means input port 316 has a family identifier of 0, an x-position of 0.000, and a y-position of 49.590. Code portion 340 also defines output port 317 on module B as "ftp_0_0_100_49_590_net", which means output 317 has a family identifier of 0, an x-position of 100.000, and a y-position of 49.590. Code portion 345 shows top nets for connection to the ports added in code portion 340.

The family identifiers in code portions 340 and 345 are important where modules A, B, and C have multiple instantiations, as further described below with reference to FIGS. 4A-4E.

Figure 3D:
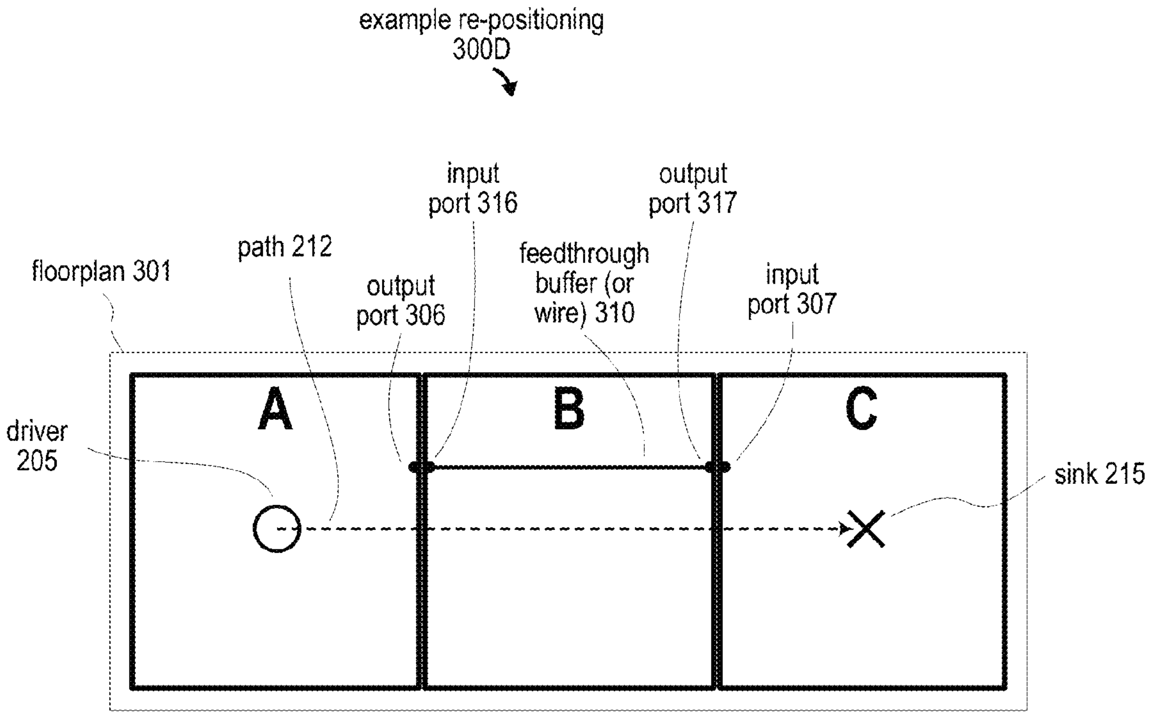
FIG. 3D is conceptual diagram illustrating an example re-positioning of ports on the floorplan.

FIG. 3D is conceptual diagram illustrating an example re-positioning 300D of ports on the floorplan 301. Once the system has determined that the feedthrough buffer (or wire) 310 needs to pass through module B, the system can reposition the ports. The ports do not have to be located where the path 212 crosses the boundaries of the modules. As shown in FIG. 3D, the ports are located at other locations along the abutted boundaries. In this example, output port 306 on module A, input port 316 on module B, output port 317 on module B, and input port 307 on module C are located above the points where path 212 crosses the boundaries of the modules.

Planning Families of Nets and Determining Reuse of Ports

Feedthrough buffer insertion in the presence of repeated partitions (e.g., multiple instantiations) poses a special challenge. The placement and routing for these modules is identical as a result of the fact that only a single physical implementation is replicated for all the instantiations during chip assembly. The paths for the top nets including any feedthrough paths which pass through repeated modules must be identical across all instantiations. In terms of the external interface of the partition modules, the pins including feedthrough pins occur at identical locations across repeated modules.

Since the partitions on the floorplan are abutted, the pins are connected electrically to the neighboring partitions' pins without requiring intervening channel wires. The abutted pins must be logically connected. Otherwise, a short violation will occur in the physical implementation.

Figure 4A:
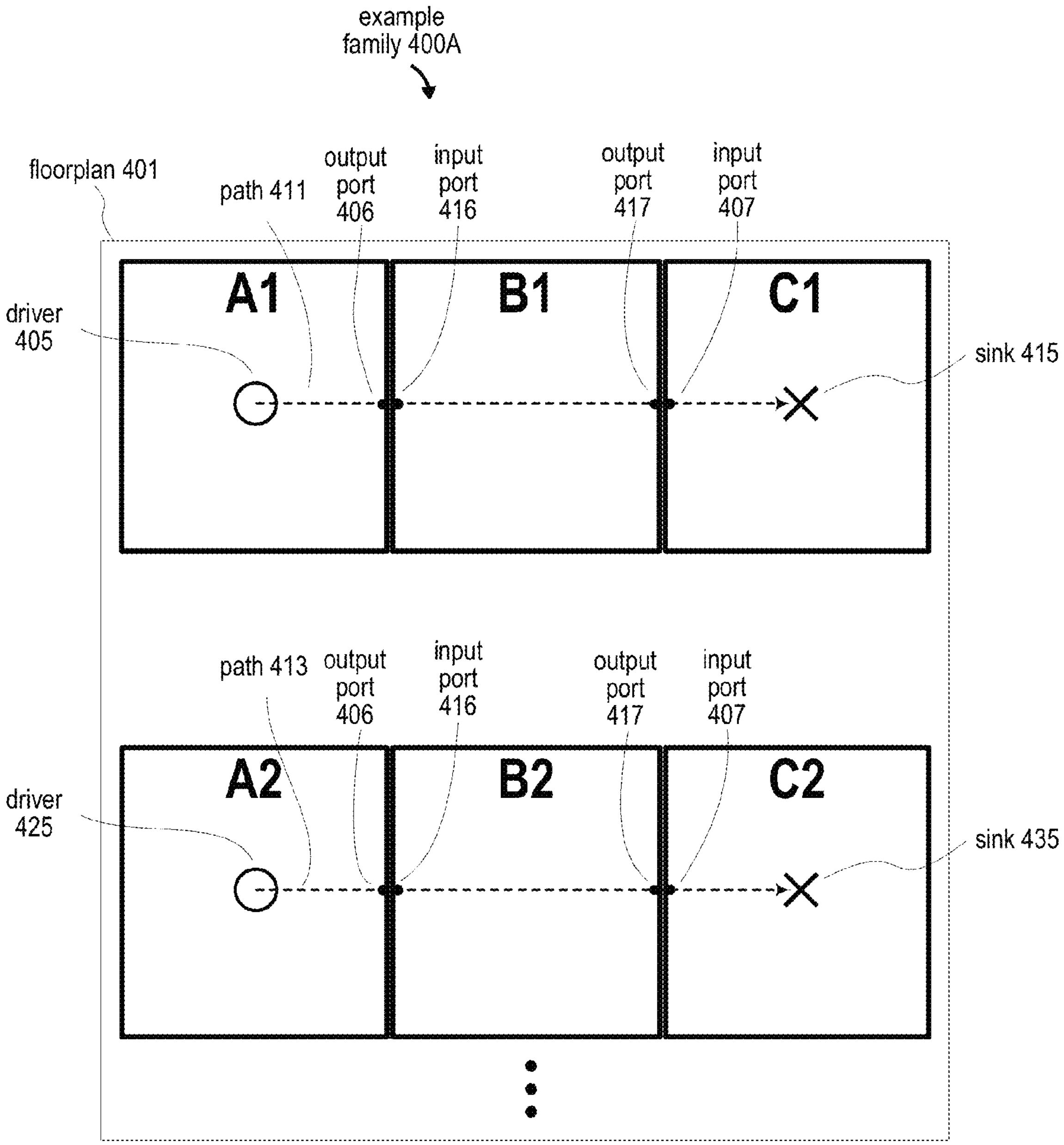
FIG. 4A is a conceptual diagram that illustrates an example family of nets.

FIG. 4A is a conceptual diagram that illustrates an example family 400A of nets. The top-level design team 216 directs the system to divide the nets in the floorplan 401 into families. As further described below, a family includes the nets in the design whose paths are interdependent because of their connectivity to a common port. If two nets connect to a port of the same name (e.g., identifier) in different instantiations of a module, then the two nets are in the same family as siblings. If a net is connected to multiple ports, then all the ports must be considered. Hence, the family may include siblings related directly by the same port name, siblings of siblings, and so forth.

The floorplan 401 includes multiple instantiations of module A, multiple instantiations of module B, and multiple instantiations of module C. The instantiations of module A include instantiation A1, instantiation A2, and so on. The instantiations of module B include instantiation B1, instantiation B2, and so on. The instantiations of module C include instantiation C1, instantiation C2, and so on.

The top-level design team 216 directs the system to place modules from left to right. For example, instantiation A1 is abutted next to instantiation B1, which is abutted next to instantiation C1. Instantiation B1 is positioned between instantiation A1 and instantiation C1. Instantiation A2 is abutted next to instantiation B2, which is abutted next to instantiation C2. Instantiation B2 is positioned between instantiation A2 and instantiation C2. The specifications of these instantiations are for explanatory purposes. In another floorplan, for example, the instantiations may be sized differently and/or placed in isolation without being abutted.

Where there are potentially millions of connections that need to be made between modules, the process of planning feedthrough ports can be immensely time consuming. The techniques provided below provide a way to reduce the time involved with planning feedthrough ports. In particular, by dividing the nets into mutually exclusive families and trying out simpler path combinations for each family, the top-level design team 216 can improve the efficiency of the IC design process.

The top-level design team 216 directs the system to identify driver-sink pairs on the floorplan 401. In the example of FIG. 4A, the system identifies driver 405 on instantiation A1 paired with sink 415 on instantiation C1. The system also identifies driver 425 on instantiation A2 paired with sink 435 on instantiation C2. Each driver is a source component that is designed to transmit signals to the corresponding sink, which is a receiver component. There may be numerous sinks driven by a source, each sink being part of a different driver sink pair, but the driver being the same for all of the sinks.

For each driver-sink pair, the system identifies a path (e.g., air-line or transmission route) that extends from the driver to the sink. Because instantiation B1 is an intermediate instantiation between instantiations A1 and C1, the top-level design team 216 desires to design a path that passes through instantiation B1. Likewise, the top-level design team 216 desires to design a transmission route that passes through instantiation B2, which is positioned directly between instantiation A2 and instantiation C2. To design each transmission route, the top-level design team 216 directs the system to calculate appropriate locations of ports at the boundaries of the modules.

Accordingly, the system identifies a path that extends from instantiation A1, through instantiation B1, and to instantiation C1. For example, the system extends a path 411 from the center of instantiation A1, through instantiation B1, and to the center of instantiation C1. In one embodiment, path 411 includes an air-line that represents a linear path between driver 405 on instantiation A1 and sink 415 on instantiation C1.

The system also identifies a path that extends from instantiation A2, through instantiation B2, and to instantiation C2. For example, the system extends a path 413 from the center of instantiation A2, through instantiation B2, and to the center of instantiation C2. In one embodiment, path 413 includes an air-line that represents a linear path between driver 425 on instantiation A2 and sink 435 on instantiation C2.

The system identifies a possible location for a driver's output port by using a point at which a path (e.g., air-line or transmission route) exits the boundary of the instantiation that has the driver. For example, the system can use the path 411 to identify a possible location for an output port on instantiation A1. Likewise, the system can use the path 413 to identify a possible location for an output port on instantiation A2.

The system identifies a possible location for a sink's input port by using a point at which a path (e.g., air-line or transmission route) enters the boundary of the instantiation which has the sink. For example, the system can use the path 411 to identify a possible location for an input port on instantiation C1. Likewise, the system can use the path 413 to identify a possible location for an input port on instantiation C2.

The system identifies possible locations for feedthrough ports by using points at which a path (e.g., air-line or transmission route) enters and exits the boundary of each intermediate instantiation. For example, the system can use the path 411 to identify a possible location for an input port on instantiation B1, and a possible location for an output port on instantiation B1. Likewise, the system can use the path 413 to identify a possible location for an input port on instantiation B2, and a possible location for an output port on instantiation B2.

The system determines if the paths cross the boundaries of the instantiations at identical input locations or identical output locations. In one embodiment, the existing ports must be at identical locations. The new ports may be at identical locations in which case the new port may be reused across instantiations. For example, in the example of FIG. 4A, path 411 cross the boundaries of the instantiations at the identical locations that path 413 crosses the boundaries of the instantiations. The system can then generate ports, if required, for each module, wherein each port will be physically positioned on all instantiations of the module. For instance, the system can generate an input port 416 on module B (for instantiations B1, B2, etc.), an output port 417 on module B (for instantiations B1, B2, etc.). The system can use the existing output port 406 on module A (for instantiations A1, A2, etc.) and input port 407 (for instantiations C1, C2, etc.).

Based on where each path 411 and 413 crosses each instantiation boundary, the system can generate new top level nets to connect to the ports. The system can use the original net for one of these connections. For example, the system can connect a top net to output port 406 on instantiation A1 and input port 416 on instantiation B1. Likewise, the system can connect a top net to output port 406 on instantiation A2 and input port 416 on instantiation B2. Likewise, a top net to output port 417 on instantiation B1 and input port 407 on instantiation C1. Likewise, a top net to port 417 on instantiation B2 and port 407 on instantiation C2.

The system assigns a family identifier and a location to each port. Also, the system connects a top net to a pair of ports.

Each sink inside a module can be represented by a port through which the sink connects. For example, sink 415 on instantiation C1 can be represented by input port 407. Sink 435 on instantiation C2 can also be represented by input port 407. A port may represent multiple sinks.

Each driver inside a module can be represented by the port through which the driver connects. For example, driver 405 on instantiation A1 can be represented by output port 406. Driver 425 on instantiation A2 can also be represented by output port 406. In one embodiment, sinks in the driver modules that do not need feedthroughs are not considered.

In another embodiment (not shown in FIG. 4A), the paths 411 and 413 do not cross at the same locations on the boundaries of instantiations B1 and B2. The locations of the ports are not identical. The system assigns the same family identifiers, but different locations, to the port names. Thus, the different port names do not interfere logically or physically.

FIG. 4B is an example netlist 400B for the floorplan 401 before a feedthrough buffer is added to module B (for instantiations B1 and B2) of FIG. 4A. Netlist 400B is written in a hardware description language (HDL).

Netlist 400B defines ports, among other things. For example, code portion 447 defines module A as having an output port. Code portion 449 shows module B as currently having a null set, meaning module B currently does not include any ports. Code portion 451 defines module C as having an input port.

Netlist 400B also defines top nets (e.g., wires) for the instantiations. For example, code portion 445 defines instantiation A1 as including a net ("net1") that is ready to be connected to an output port on instantiation A1. Instantiation A2 includes a net ("net2") that is ready to be connected to an output port on instantiation A2. Instantiation B1 has a null set, for example, no net. Instantiation B2 has a null set, for example, no net. Instantiation C1 includes a net ("net1") that is ready to be connected to an input port on instantiation C1. Instantiation C2 includes a net ("net2") that is ready to be connected to an input port on instantiation C2.

FIG. 4C is an example netlist 400C for the floorplan 401 after feedthrough buffers are added to module B of FIG. 4A. Netlist 400C includes a modification of the HDL of netlist 400B of FIG. 4B. By modifying the HDL of netlist 400B of FIG. 4B, the top-level team 216 directs the system to generate feedthrough buffers on intermediate module B and to plan one or more families for the feedthrough buffers (e.g., ports and nets).

As shown in FIG. 4C, code portion 465 defines input port 416 on module B as "ftp_0_0_000_49_590", which means input port 416 has a family identifier of 0, an x-position of 0.000, and a y-position of 49.590. Code portion 465 also defines output port 417 on module B as "ftp_0_100_000_49_590", which means output 417 has a family identifier of 0, an x-position of 100.000, and a y-position of 49.590.

Code portion 467 shows top nets for connection to the ports that are added in code portion 465. The system may assign different labels in the netlist to nets that are physically the same at the block level (e.g., the level where the net is physically implemented). For example, in code portion 467, "net1" is connected on instantiation B1, while "net2" is connected on instantiation B2. Although "net1" and "net2" have different labels on the netlist 400C, the system physically implements "net1" and "net2" as the same route or wire.

The family identifiers in code portions 465 and 467 are important because modules A, B, and C of FIG. 4A have multiple instantiations. The family identifiers organize the nets and enable each physical design team to design each module to be logically and physically correct.

Figure 4D:
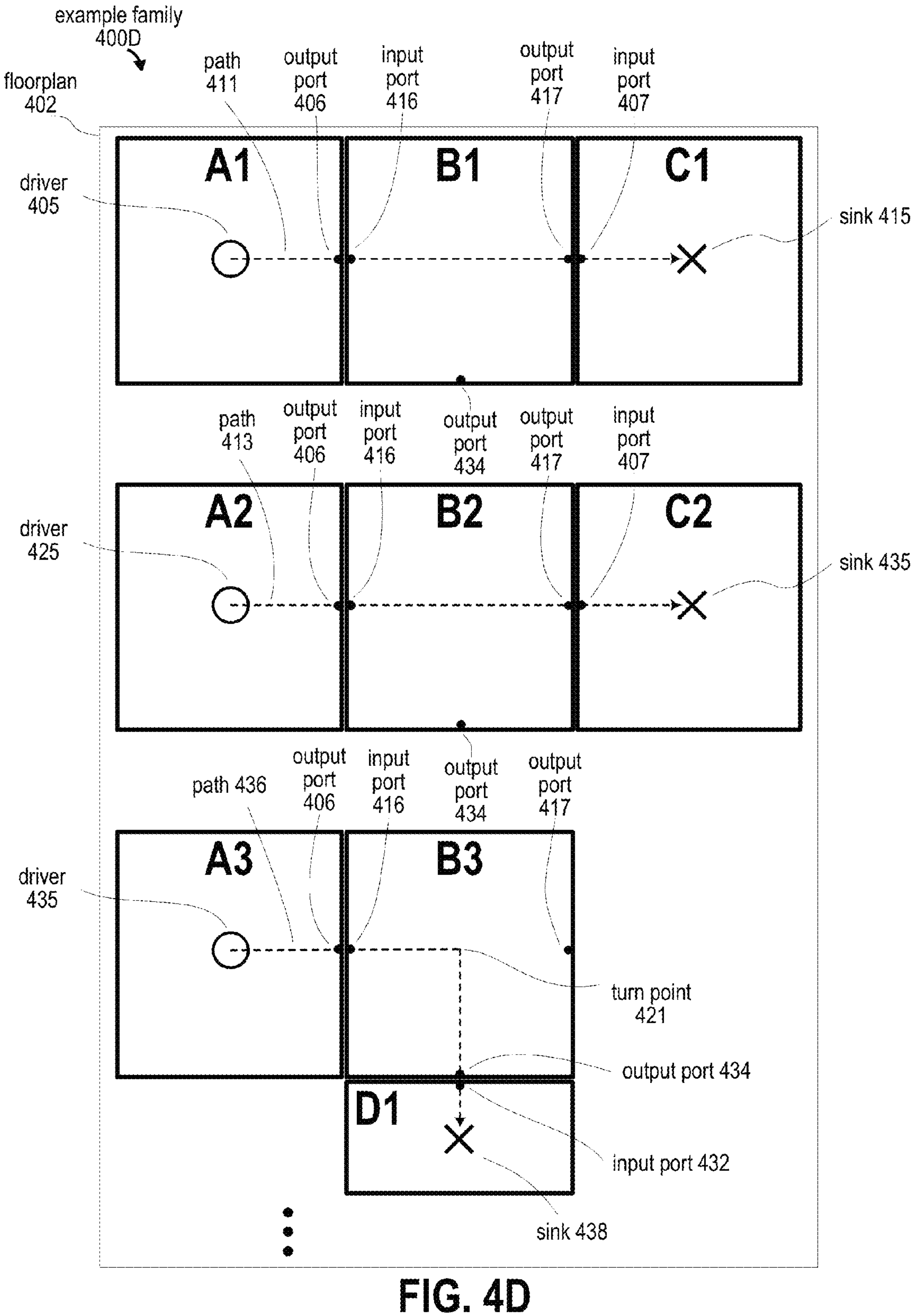
FIG. 4D is a conceptual diagram that illustrates an example family of nets.

FIG. 4D is a conceptual diagram that illustrates an example family 400D of nets. A purpose of FIG. 4D is to show how nets can belong to the same family 400D while having different output ports on the intermediate module.

Floorplan 402 of FIG. 4D is similar to floorplan 401 of FIG. 4A. However, floorplan 402 of FIG. 4D further includes instantiation A3 (of module A), instantiation B3 (of module B), and instantiation D1 (of a module D). Instantiation A3 is abutted next to instantiation B3, which is abutted next to instantiation D1. Instantiation A3 is positioned to the left of instantiation B3. Instantiation D1 is positioned next to the bottom edge of instantiation B3.

In addition to the driver-sink pairs identified above in FIG. 4A, the top-level design team 216 further directs the system to identify driver-sink pairs on the floorplan 402 of FIG. 4D. For example, the system identifies driver 435 on instantiation A3 paired with sink 438 on instantiation D1.

For the addition driver-sink pair, the system generates a path (e.g., transmission route or air-line) that extends from the driver to the sink. Because instantiation B3 is an intermediate instantiation between instantiations A3 and D1, the top-level design team 216 desires to design a path that passes through instantiation B3. To design the transmission route, the top-level design team 216 directs the system to calculate appropriate locations of ports at the boundaries of the modules.

In one embodiment, the system identifies a path that extends from instantiation A3, through instantiation B3, and to instantiation D1. For example, the system extends a path 436 from the center of instantiation A3, through instantiation B3, and to instantiation D1. In this example, path 436 includes one turn point 421. A turn point is a location that represents a change in direction along a path (e.g., route, net, air-line, wire, feedthrough buffer, etc.).

The system identifies a possible location of a driver's output port by using a point at which a path (e.g., air-line or transmission route) exits the boundary of the instantiation that has the driver. For example, the system can use the path 436 to identify a possible location for an output port on instantiation A3.

The system identifies a possible location for a sink's input port by using a point at which a path (e.g., air-line or transmission route) enters the boundary of the instantiation which has the sink. For example, the system can use the path 436 to identify a possible location for an input port on instantiation D1.

The system identifies a possible location for feedthrough ports by using points at which a path (e.g., air-line or transmission route) enters and exits the boundary of each intermediate instantiation. For example, the system can use the path 436 to identify a possible location for an input port on instantiation B3, and a possible location for an output port on instantiation B3.

Accordingly, based on the path 436 crosses each module boundary, the system can generate a feedthrough ports and nets. For example, in the example of FIG. 4D, path 436 intersects the boundaries of instantiations A3 and B3 at the same locations path 411 intersects the boundaries of instantiations A1 and B1. Accordingly, the system can connect a net to output port A3 on instantiation A3 and input port 416 on instantiation B3.

Further, the system needs to generate a new output port 434 on module B (for instantiations B1, B2, B3, etc.). The system can then assign a net on instantiation B3 to use output port B3. Output port 434 is physically present, but is not used, on instantiations B1 and B2. The system also needs to generate an input port 432 on instantiation D1. The system can assign a net on instantiation D1 to use input port 432.

The system assigns a family identifier and a location to each added port's name. Also, the system connects a top net to a pair of ports.

However, output port 434 on instantiation B3 is at a different location than output port 417 on instantiation B1. Hence, the output port 417 is not connected to a top net in instantiation B3. The output ports 434 are not connected to a top net in instantiations B1 and B2.

Each sink inside a module can be represented by a port through which the sink connects. For example, sink 438 on instantiation D1 can be represented by input port 432. Likewise, each driver inside a module can be represented by the port through which the driver connects. For example, driver 435 on instantiation A3 can be represented by output port 406.

Backtracking to Maintain Port Consistency Across Multiple Instantiations

Figure 5A:
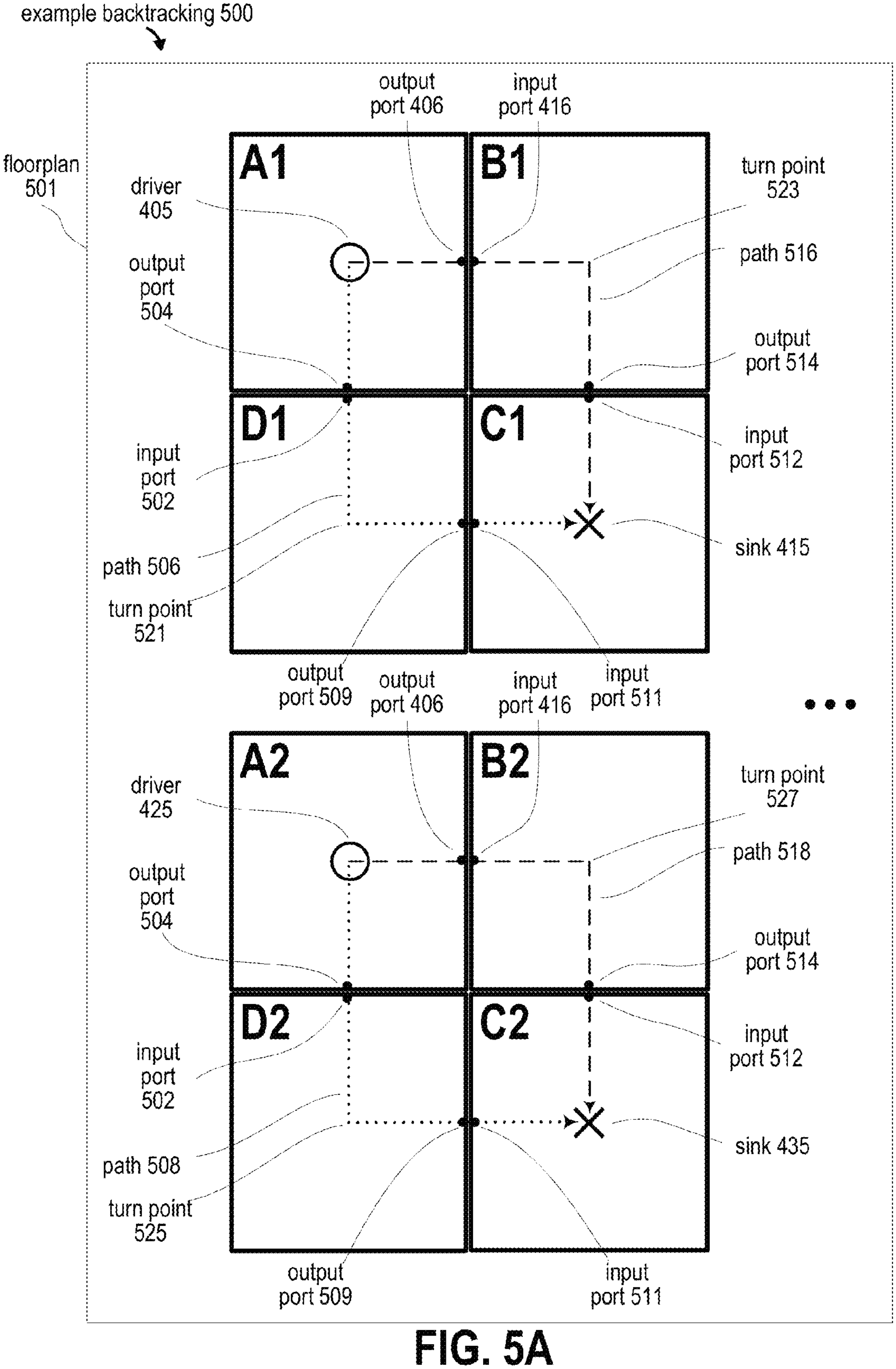
FIG. 5A is a conceptual diagram of an example backtracking to maintain port consistency across multiple modules.

FIG. 5A is a conceptual diagram of an example backtracking 500 to maintain port consistency across multiple modules. Backtracking may be an aspect of planning families of nets, such as the planning described with reference to FIGS. 4A-4E. If port locations are not consistent across multiple instantiations of a module, then the system backtracks and uses another combination of paths (e.g., air-lines or transmission routes).

A floorplan 501 includes multiple instantiations of module A, multiple instantiations of module B, multiple instantiations of module C, and multiple instantiations of module D. The instantiations of module A include instantiation A1, instantiation A2, and so on. The instantiations of module B include instantiation B1, instantiation B2, and so on. The instantiations of module C include instantiation C1, instantiation C2, and so on. The instantiations of module D include instantiation D1, instantiation D2, and so on. The top-level design team 216 directs the system to place modules as shown in FIG. 5A.

The top-level design team 216 directs the system to identify driver-sink pairs on the floorplan 501. In the example of FIG. 5A, the system identifies driver 405 on instantiation A1 paired with sink 415 on instantiation C1. The system also identifies driver 425 on instantiation A2 paired with sink 435 on instantiation C2. Each driver is a source component that is designed to transmit signals to the corresponding sink, which is a receiver component.

For each driver-sink pair, the system identifies a path (e.g., air-line or transmission route) that extends from the driver to the sink. Because instantiation B1 is an intermediate instantiation between instantiations A1 and C1, the top-level design team 216 desires to design a path that passes through instantiation B1. Likewise, the top-level design team 216 desires to design a transmission route that passes through instantiation B2, which is positioned directly between instantiation A2 and instantiation C2.

Accordingly, the system identifies a path that extends from instantiation A1, through instantiation B1, and to instantiation C1. For example, the system extends a path 516 from the center of instantiation A1, through instantiation B1, and to the center of instantiation C1. Likewise, the system identifies a path that extends from the center of instantiation A2, through instantiation B2, and to the center of instantiation C2. For example, the system extends a path 518 from center of instantiation A2, through instantiation B2, and to the center of instantiation C2.

Unlike floorplan 401 FIG. 4A, on floorplan 501 of FIG. 5A, the system further identifies another possible path that extends from instantiation A1, through instantiation D1, and to instantiation C1. For example, the system extends a path 506 from the center of instantiation A1, through instantiation D1, and to instantiation C1. Likewise, the system identifies a path that extends from instantiation A2, through instantiation D2, and to instantiation C2. For example, the system extends a path 508 from center of instantiation A2, through instantiation D2, and to instantiation C2.

The system can generate the same ports for a particular path combination. For example, for paths 516 and 518, the system can generate output port 406 on module A (instantiations A1 and B1), input port 416 on module B (instantiations B1 and B2), output port 514 on module B (instantiations B1 and B2), and input port 512 on module C (instantiations C1 and C2). Likewise, for paths 506 and 508, the system can generate output port 504 on module A (instantiations A1 and B1), input port 502 on module D (instantiations D1 and D2), output port 509 on module D (instantiations D1 and D2), and input port 511 on module C (instantiations C1 and C2).

The system selects paths that maintain port consistency on the floorplan 501. For example, the system can decide to generate the ports for paths 516 and 518. In such a case, the system generates ports 406, 416, 514, and 512. Alternative, the system can select the ports for paths 506 and 508. In such a case, the system generates ports 504, 502, 509, and 511.

In contrast, the system does not select paths that compromise port consistency on the floorplan 501. For example, the system does not generate the ports for path 516 along with ports for path 508. Likewise, the system does not generate ports for path 516 along with ports for path 508. Such selections would be physically infeasible or at least physically inefficient. The top-level team 216 desires to use one feedthrough buffer (e.g., one wire) for both sets of instantiations. The ports that the system generates are physically present on all instantiations of a module. It would be physically infeasible to have two different sets of ports and only one feed through buffer (e.g., one wire) on the intermediate module. Accordingly, the system selects either one set of ports (e.g., ports 406, 416, 514, and 512) or the other set of ports (e.g., 504, 502, 509, and 511).

To help determine which set of ports to use, the system may consider routing blockages. For example, for ports 406, 416, 514, and 512, the system analyzes a potential physical route (e.g., feedthrough buffer, net, or wire) for paths 506 and 508. Likewise, for ports 504, 502, 509, and 511, the system analyzes a potential physical route for paths 516 and 518. If the system determines that the physical route for paths 516 and 518 would not cause a routing blockage, and then determines that the physical route for paths 506 and 508 would cause a routing blockage, then the system backtracks and selects ports 406, 416, 514, and 512 and paths 516 and 518. Alternatively, if the system determines that the physical route for paths 506 and 508 would not cause a routing blockage, and then determines that the physical route for paths 516 and 518 would cause a routing blockage, then the system backtracks and selects ports 504, 502, 509, and 511 and paths 506 and 508.

The number possible path combinations may be calculated by using the following equation:

$$[\text{Number of possible path combinations}]=[\text{Number of path patterns per pair}]^{(\text{Number of pairs})} \qquad \text{Equation 1.}$$

To limit the number of possible path combinations explored, the number of path patterns per pair to be considered is limited. For example, the number of possible path combinations explored in floorplan 501 is four. Using Equation 1 above, the number of path patterns considered for each pair is two (e.g., paths 506 and 516 for the first driver-sink pair, and paths 508 and 518 for the second driver-sink pair). Also, the number of driver-sink pairs is two (e.g., a first pair including driver 405 and sink 415, and a second pair including driver 425 and sink 435). Accordingly, four possible path combinations=(two path patterns per pair)^(two pairs).

The system prioritizing the processing of patterns according to simplicity because there may be a multitude of possible path combinations. For example, a floorplan (not shown) may have one hundred driver-sink pairs, and three possible patterns per driver-sink pair. In that case, there may be about 3^100 possible combinations according to Equation 1 above. That enormous number may cause the system to take a huge amount of time to consider all the possible combinations. Accordingly, the system prioritizes the processing by considering the simpler path patterns first. When the system identifies a path pattern that is acceptable, then the system may forego considering additional path patterns in order to keep the design time down.

Paths having fewer turn points tend to be simpler than paths have more turn points. As described above with reference to FIG. 4D, a turn point is a location that represents a change in direction along a path (e.g., route, net, air-line, wire, feedthrough buffer, etc.).

The number of turn points along a path is indicative of the number of possible path combinations for the system to consider. Each path may include zero or more turn points. In one embodiment, to limit search time, the system only considers paths with up to two turn points. The presence of zero turn points along a path means the system likely needs to consider only one path combination on the multiple instantiations. Referring briefly to FIG. 4A, path 411 includes zero turn points. Likewise, path 413 includes zero turn points. The presence of one turn point along a path means there may be multiple path combinations for the system to consider. Referring to FIG. 5A, each path includes one turn point. Path 516 includes one turn point 523 on instantiation B1. Likewise, path 518 includes one turn point 527 on instantiation B2. Likewise, path 506 includes one turn point 521 on instantiation D1. Likewise, path 508 includes one turn point 525 on instantiation D2. The presence of two turn points (not shown) means the system may need to consider even more path combinations.

FIG. 5B is an example netlist 500B for the floorplan 501 before a feedthrough buffer is added to an intermediate module (e.g., module B or module D) of FIG. 5A. Netlist 500B is written in a hardware description language (HDL).

Netlist 500B defines ports, among other things. For example, code portion 535 defines module A as having an output port. Code portion 537 shows module B as currently having a null set, meaning module B currently does not include any ports. Code portion 539 defines module C as having an input port. Code portion 541 shows module D as currently having a null set, meaning module D currently does not include any ports.

Netlist 500B also defines top nets (e.g., wires) for the instantiations. For example, code portion 543 defines instantiation A1 as including a net ("net1") that is ready to be connected to an output port on instantiation A1. Instantiation A2 includes a net ("net2") that is ready to be connected to an output port on instantiation A2. Instantiation B1 has a null set, for example, no net. Instantiation B2 has a null set, for example, no net. Instantiation C1 includes a net ("net1") that is ready to be connected to an input port on instantiation C1. Instantiation C2 includes a net ("net2") that is ready to be connected to an input port on instantiation C2. Instantiation D1 has a null set, for example, no net. Instantiation D2 has a null set, for example, no net.

FIG. 5C is an example netlist 500C for the floorplan 501 after feedthrough buffers are added to module D of FIG. 5A. Netlist 500C includes a modification of the HDL of netlist 500B of FIG. 5B. By modifying the HDL of netlist 500B of FIG. 4B, the top-level team 216 directs the system to generate feedthrough buffers on intermediate module D and to plan on or more families for the feedthrough buffers (e.g., ports and nets).

As shown in FIG. 4C, code portion 565 defines input port 502 on module D as "ftp_0_100_000_200_070", which means input port 502 has a family identifier of 0, an x-position of 100.000, and a y-position of 200.070. Code portion 565 also defines output port 509 on module D as "ftp_0_200_000_100_035", which means output 509 has a family identifier of 0, an x-position of 200.000, and a y-position of 100.035.

Code portion 567 shows top nets for connection to the ports that are added in code portion 565. The system may assign different labels in the netlist to nets that are physically the same at the block level (e.g., the level where the net is physically implemented). For example, in code portion 567, "net1" is connected on instantiation D1, while "net2" is connected on instantiation D2. Although "net1" and "net2" have different labels on the netlist 500C, the system physically implements "net1" and "net2" as the same route or wire.

The family identifiers in code portions 565 and 567 are important because modules A, B, and D of FIG. 5A have multiple instantiations. The family identifiers organize the nets and enable each physical design team to design each module to be logically and physically correct.

Overview of Splitting a Driver's Output Ports

Output port splitting is typically undesirable. In one embodiment, the system is not enabled to split a driver's output port in a first pass for planning ports. However, if the system cannot establish a viable output port for the driver, then the system is enabled to split a driver's output if necessary.

Figure 6A:
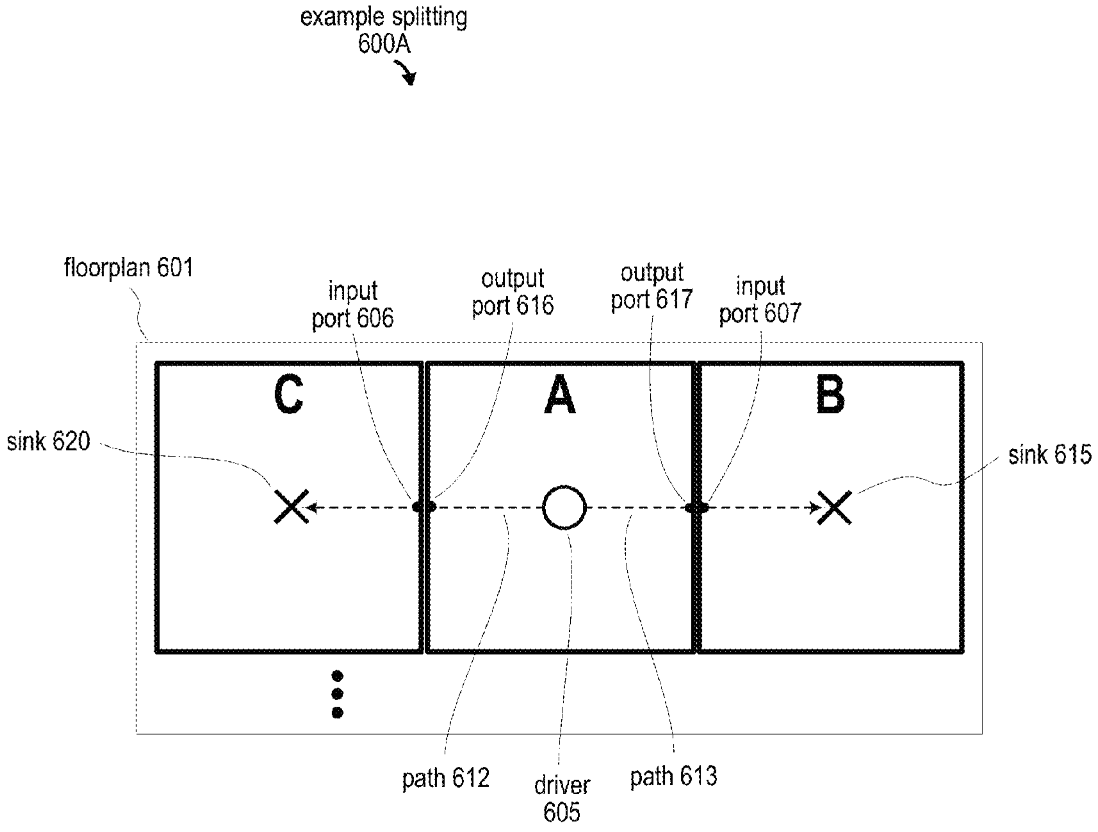
FIG. 6A is a conceptual diagram of an example splitting of a driver's output ports on a module A.

FIG. 6A is a conceptual diagram of an example splitting 600A of a driver's output ports on a module A. Splitting output ports may be an aspect of planning families of feedthrough buffers, such as the planning described with reference to FIGS. 4A-4E. The floorplan 601 includes module A, module B, and module C. The top-level design team 216 directs the system to place modules as shown in FIG. 6A.

The top-level design team 216 directs the system to identify driver-sink pairs on the floorplan 601. In the example of FIG. 6A, the system identifies driver 605 on module A paired with sink 615 on module B. The system also identifies driver 605 on module A paired with sink 620 on module C. Accordingly, driver 605 is paired with two difference sinks on two different modules. Each driver is a source component that is designed to transmit signals to the corresponding sink, which is a receiver component.

For each driver-sink pair, the system identifies a path (e.g., air-line or transmission route) that extends from the driver to each sink. For example, the system extends a path from the center of module A to the center of module B. Likewise, the system extends a path from the center of module A to the center of module C.

The system identifies a possible location for a driver's output port by using a point at which a path (e.g., air-line or transmission route) exits the boundary of the module which has the driver. For example, the system can use the path 613 to identify a possible location for an output port 617 on the right side module A. Likewise, the system can use the path 612 to identify a possible location for an output port 616 on the left side of module A.

The system identifies a possible location for a sink's input port by using a point at which a path (e.g., air-line or transmission route) enters the boundary of the module which has the sink. For example, the system can use the path 613 to identify a possible location for an input port 607 on module B. Likewise, the system can use the path 612 to identify a possible location for an input port 606 on module C.

The arrangement of the modules of FIG. 6A presents a logical challenge for the system. If the system places one output port on the left hand side, then the driver 605 would need channel routing to connect with sink 615 on module B. On the other hand, if the system places one output port on the right hand side, then the driver would need channel routing to connect with sink 620 on module C.

A solution to this challenge is to split an output port on module A. For example, the system generates output port 617 on module A. The system splits output port 617 to generate output port 616, which is driven by a feedthrough buffer that is driven by the source driver 605. The feedthrough buffer runs through module A, which is the source module. Such splitting is not like feedthrough buffers generated with reference to FIG. 3A, 4A, or 5A. In the example of FIG. 6A, the system is splitting output with existing input. Accordingly, the system can generate multiple output ports from the same source driver 605 on a module A. The top-level design team 216 modifies the netlist to inform physical design team A that a feedthrough buffer is to be generated within the source module A.

FIG. 6B is an example netlist 600B for the floorplan 601 before a feedthrough buffer is added to module A of FIG. 6A. Netlist 600B is written in a hardware description language (HDL).

Netlist 600B defines ports, among other things. For example, code portion 635 defines module A as having an output port. Code portion 637 shows module B as currently having an input port. Code portion 639 defines module C as having an input port.

Netlist 600B also defines top nets (e.g., wires) for the modules. For example, code portion 641 defines module A as including a net that is ready to be connected to an output port on module A, an input port on module B, and an input port on module C.

FIG. 6C is an example netlist 600C for the floorplan 601 after a feedthrough buffer is added to module A of FIG. 6A. Netlist 600C includes a modification of the HDL of netlist 600B of FIG. 6B. By modifying the HDL of netlist 600B of FIG. 6B, the top-level design team 216 directs the system to generate a feedthrough buffer (e.g., ports and nets) on module A.

As shown in FIG. 6C, code portion 665 defines split output port 607 on module A as "ftp_0_100_000_50_000", which means input port 607 has a family identifier of 0, an x-position of 100.000, and a y-position of 50.000. Code portion 665 also indicates feedthrough is to extend across module A starting from split output port 607.

Code portion 667 shows top nets for connection to the split port added in code portion 665. For example, "ftnet_0" is connected on module B to the split output port 617 and extends across source module A.

The family identifiers in code portions 665 and 667 are important where modules A, B, and C have multiple instantiations, as described above with reference to FIGS. 4A-4E.

Avoiding Splitting a Driver's Output Port

As discussed above, it is usually undesirable to split a driver's output port. Accordingly, the system avoids splitting an output port if a more efficient alternative port placement is available.

Figure 7:
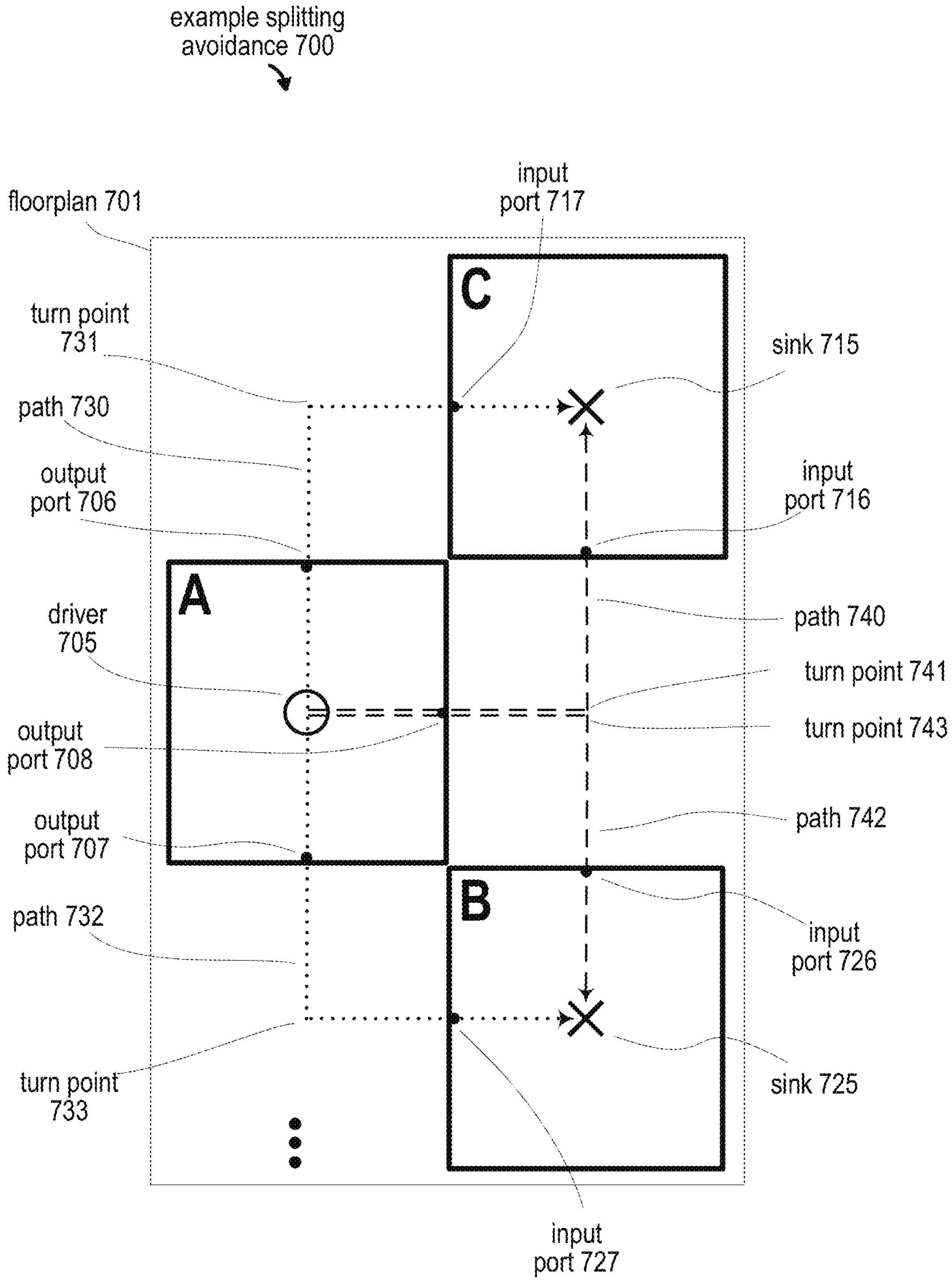
FIG. 7 is a conceptual diagram of an example splitting avoidance on a floorplan.

FIG. 7 is a conceptual diagram of an example splitting avoidance 700A on a floorplan 701. Avoidance of splitting may be an aspect of planning families of feedthrough buffers, such as the planning described with reference to FIGS. 4A-4E. The floorplan 701 includes module A, module B, and module C. The top-level design team 216 directs the system to place modules as shown in FIG. 7.

The top-level design team 216 directs the system to identify driver-sink pairs on the floorplan 701. In the example of FIG. 7, the system identifies driver 705 on module A paired with sink 725 on module B. The system also identifies driver 605 on module A paired with sink 715 on module C. Accordingly, driver 705 is paired with two difference sinks on two different modules. Each driver is a source component that is designed to transmit signals to the corresponding sink, which is a receiver component.

For each driver-sink pair, the system generates paths (e.g., air-lines or transmission routes) that extend from the driver to each sink. For example, the system extends paths from the center of module A to the center of module B. Two different possible paths from driver 705 to sink 715 include path 730 and path 740. Likewise, the system extends paths from the center of module A to the center of module C. Two different possible paths from driver 705 to sink 725 include path 732 and path 742.

Each path includes one turn point at about a midway point of each path. For example, path 730 includes turn point 731. Path 732 includes turn point 733. Path 740 includes turn point 741. Path 742 includes turn point 743. In another embodiment, a path may include another number of turn points (e.g., two turn points).

The system identifies the possible path combinations. For example, the system identifies a first combination including paths 730 and 732, and a second combination including paths 740 and 742.

The system identifies a possible location for a driver's output port by using a point at which a path (e.g., air-line or transmission route) exits the boundary of the module that has the driver. For example, the system can use paths 740 and 742 to identify a possible location for an output port 708 at the right boundary module A. Likewise, the system can use the paths 730 and 732 to identify possible locations for split output ports 706 and 707 at the top and bottom boundaries of module A.

The system identifies a possible location for a sink's input port by using a point at which a path (e.g., air-line or transmission route) enters the boundary of a module that has a sink. For example, the system can use the path 732 to identify a possible location for an input port 727 on module B. Likewise, the system can use the path 742 to identify a possible location for an input port 726 on module B. Likewise, the system can use the path 730 to identify a possible location for an input port 717 on module C. Likewise, the system can use the path 740 to identify a possible location for an input port 716 on module C.

The system prefers path combinations that do not split an output port. Accordingly, the system determines if any path combination requires a split output port. The system determines that the first combination including paths 730 and 732 may require splitting output ports, including output ports 706 and 707. However, the system determines that the second combination including paths 740 and 742 requires only a single output port 708, and does not require splitting output ports.

The system determines if any path combination is associated with a routing blockage or a hard macro (e.g., core component that cannot be meaningfully modified by chip designers). If so, then the system decides not to use that path combination. For example, if the first path combination results in a routing blockage while the second path combination does not, then the system chooses the second path combination. Likewise, if the second path combination results in a routing blockage while the first path combination does not, then the system chooses the first path combination.

If the second path combination does not have routing blockages or hard macros, then the system chooses the second combination including paths 740 and 742. In such a case, the system generates output port 708 on module A, input port 726 on module B, and input port 716 on module C. If the second path combination does have routing blockages or hard macros, then the system chooses the first combination including paths 730 and 732. In such a case, the system generates split output ports 706 and 707 on module A, input port 717 on module B, and input port 727 on module C.

Accordingly, a goal of the system is to minimize splitting of output ports if possible. Given alternative paths, all routing issues being roughly equal, the system chooses the path combination that does not split output ports.

Overview of Example Methods

Described below is an overview of methods for planning feedthrough ports on a floorplan. Other actions and/or details are discussed with reference to other figures and may be a part of the methods, depending on the implementation.

Figure 8A:
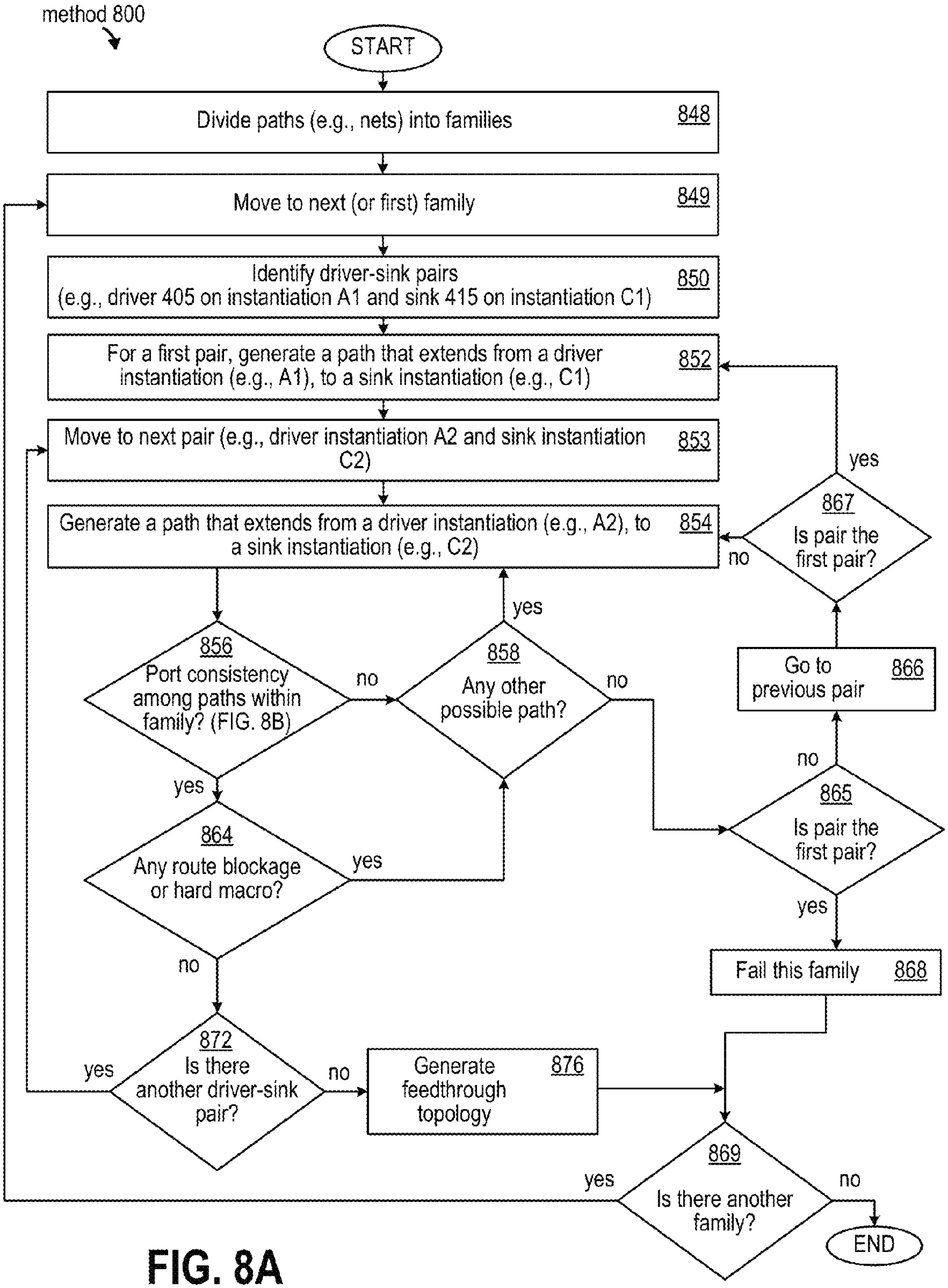
FIG. 8A is a flowchart of an example method for planning feedthrough ports on an integrated circuit (IC) floorplan.

FIG. 8A is a flowchart of an example method 801 for planning feedthrough ports on an integrated circuit (IC) floorplan. In one embodiment, the computer system 100 of FIGS. 1A-1B can carry out the operations of the method 801.

At action 848, the system divides the paths (e.g., nets) into families. At action 849, the system moves to next family, which may be the first family considered.

At action 850, the system identifies driver-sink pairs on the floorplan. For example, the system 100 identifies driver 405 on instantiation A1 paired with sink 415 on instantiation C1. The system 100 also identifies driver 425 on instantiation A2 paired with sink 435 on instantiation C2. The system may also identify a multitude of other driver-sink pairs on the floorplan.

At action 852, for a first set of instantiations, the system generates a path that extends from a driver instantiation to a sink instantiation. For example, the system extends a path 411 from the center of instantiation A1 to the center of instantiation C1. The path may cross an intermediate instantiation. For example, the path may cross through instantiation B1. The system tends to avoid splitting a driver's output port, as described with reference to FIG. 7. If system identifies a route blockage or hard macro associated with the path, then the system can another path for the first set of instantiations.

At action 853, the system moves to a next set of instantiations. For example, the system moves to a driver instantiation A2 and a sink instantiation C2.

At action 854, for the next set of instantiations, the system generates a path that extends from a driver instantiation to a sink instantiation. For example, the system extends a path 413 from the center of instantiation A2 to the center of instantiation C2. The path may cross an intermediate instantiation. For example, the path may cross through instantiation B2. The system tends to avoid splitting a driver's output port, as described with reference to FIG. 7.

At decision operation 856, the system determines if there is port consistency among the paths. Decision operation 856 is further discussed below with reference to FIG. 8B.

To determine port consistency, the system determines if the paths cross the instantiations at identical locations. For example, the system 100 determines if path 411 crosses a left boundary of instantiation B1 at the identical location that path 413 crosses the left boundary of instantiation B2. When checking for port consistency among paths (e.g., nets), the system includes paths that may be in the same family and attempts to check only a small number of path patterns. A family may include, for example, five to ten paths. However, an entire floorplan may include thousands or millions of paths. Checking all possible path combinations for consistency would take an impractically huge amount of time. Accordingly, the system identifies families and checks for port consistency only among paths within a family. As noted above, decision operation 856 is further discussed below with reference to FIG. 8B.

If the system determines there is port consistency among the paths in decision operation 856, then the method 801 moves to decision operation 864 where the system determines if there is any routing blockage or any hard macro. If there is no routing blockage or hard macro, then the method 801 moves to decision operation 872.

However, in decision operation 856, if the system determines there is no port consistency or if there is a routing blockage or a hard macro, then the method 801 moves to decision operation 858 where the system determines if any other paths are possible for the current driver-sink pair. If another path is possible, then the method 801 returns to action 854 where the system generates another path for the driver-sink pair.

However, in decision operation 858, if the system determines there if no other paths are possible, then the method 801 moves to decision operation 865 where the system determines if the current pair is the first pair. If the current is not the first pair, then the method 801 moves to action 866 where the system goes to the previous pair. Then, in decision operation 867, the system determines if the current pair is the first pair. If the current pair is the first pair, then the method 801 returns to action 852 where the system generates another path that extends from the driver instantiation to the sink instantiation.

However, in decision operation 865, if the system determines the current pair is the first pair, then the method 801 moves to action 868 where the system fails the family. Then, the method 801 moves to decision operation 869, which is further described below.

At decision operation 872, the system determines if there is another driver-sink pair for comparison to the first driver-sink pair. If the system determines there is another driver-sink pair, then the method 801 moves to action 853 and repeats steps for a next driver-sink pair. The method 801 may continue in this manner until all driver-sink pairs are processed. There may be many other driver-sink pairs that the system needs to process.

However, in decision operation 872, if the system determines there are no other driver-sink pairs, then the method 801 moves to an action 876 where the system generates the feedthrough topology for the floor plan. For example, the system generates ports and nets (e.g., modifies HDL to include nets) for connecting to the ports. Every net that is connected to the same port on the intermediate module may be assigned the same family identifier, which is the family identifier that is assigned to that port. For example, a net generated on instantiation B1 for input port 416 may be assigned the same family identifier as a net generated on instantiation B2 for input port 416.

Then, in decision operation 869, the system determines if there is another family to analyze. If there is another family, then the method 801 returns to step 849 where the system moves a next family. However, if there is not another family, then the method 801 concludes.

Other actions and/or details are discussed with reference to other figures and may be a part of the method 801, depending on the implementation. For example, as described above with reference to FIGS. 5A-5C, the system may "backtrack" in order to maintain port consistency across multiple instantiations. Also, as described above with reference to FIG. 7, the system tends to avoid "splitting" a driver's output port.

Figure 8B:
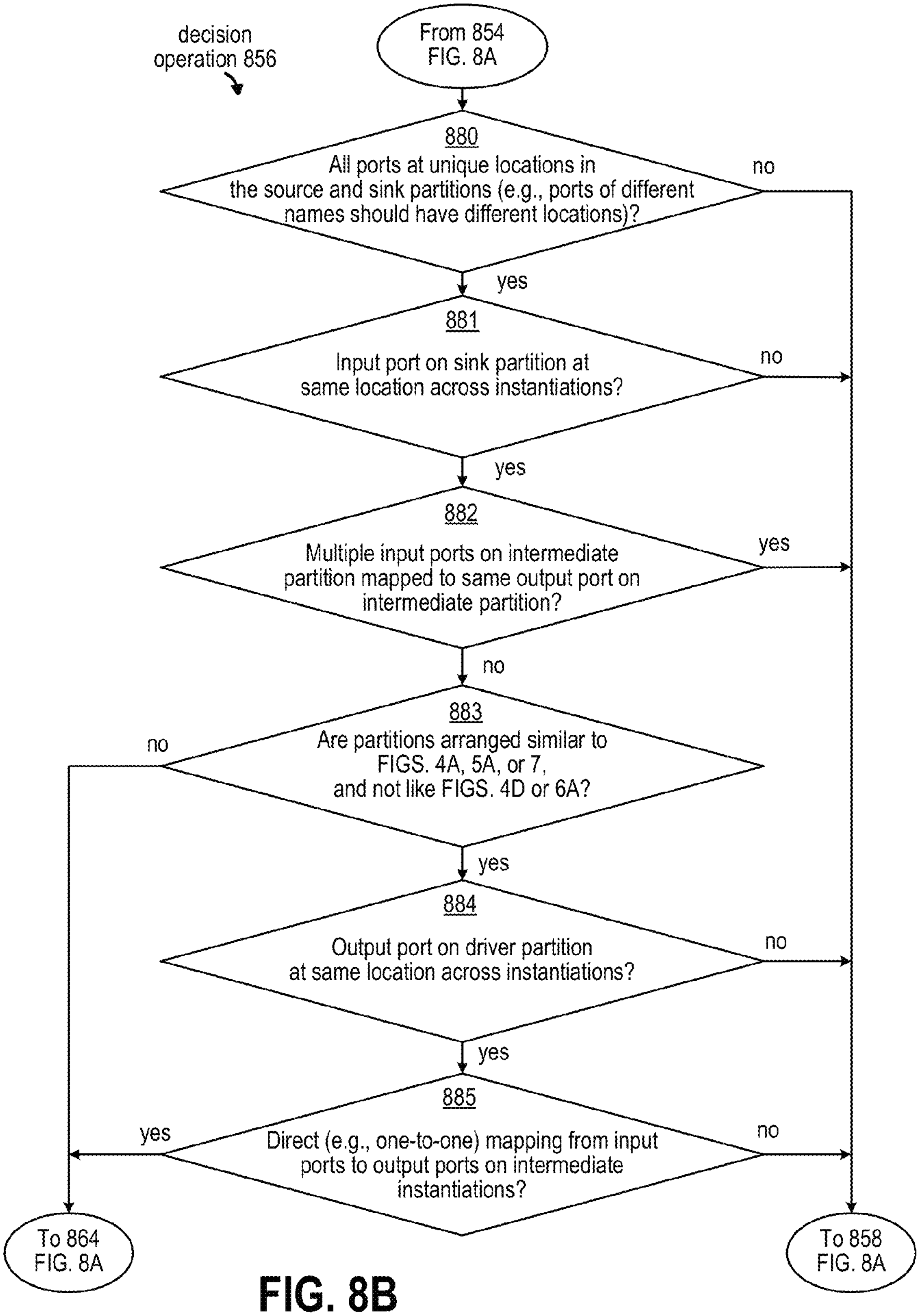
FIG. 8B is a flowchart of the decision operation for determining if there is port consistency among paths.

FIG. 8B is a flowchart of the decision operation 856 of FIG. 8A. In decision operation 880, the system determines if all ports in the currently considered family are at unique locations in the source and sink partitions. Being at unique locations means that ports of different names should not be at the same location. If no, then the system performs action 858 of FIG. 8A.

However, in decision 880, if yes, then the system performs decision operation 881 where the system determines if the input port on the sink partition is at the same location across multiple instantiations. The system performs this check for all input ports in the family. If no, then the system performs action 858 of FIG. 8A.

However, in decision operation 881, if yes, then the system performs decision operation 882 where the system determines if the multiple input ports on the intermediate partition are mapped to the same output port on the intermediate partition. If yes, then the system performs action 858 of FIG. 8A.

However, in decision 882, if no, then the system performs decision operation 883 where the system determines if the partitions are arranged similar to the partitions of FIG. 4A, 5A, or 7, and not FIG. 4D or 6A. The system determines if it is possible to find a feedthrough path that does not require creating multiple output ports mapped to a driver or input feedthrough port. For example in FIG. 4A, 5A or 7, it is possible. In FIG. 4D multiple output ports are mapped to an input feedthrough port, and in FIG. 6A multiple output ports are mapped to a driver. If no (e.g., the arrangement is like FIG. 4D or 6A), then the system performs action 864 of FIG. 8A.

However, in decision operation 883, if yes, then the system performs decision operation 884 where the system determines if the output port on the driver partition is at the same location across multiple instantiations. If no, then the system performs action 858 of FIG. 8A.

However, in decision operation 884, if yes, then the system performs decision operation 885 where the system determines if there is a direct mapping (e.g., one-to-one mapping) from the input ports to the output ports on the intermediate instantiations. If yes, then the system performs action 864 of FIG. 8A. However, if no, then the system performs action 858 of FIG. 8A.

Figure 9:
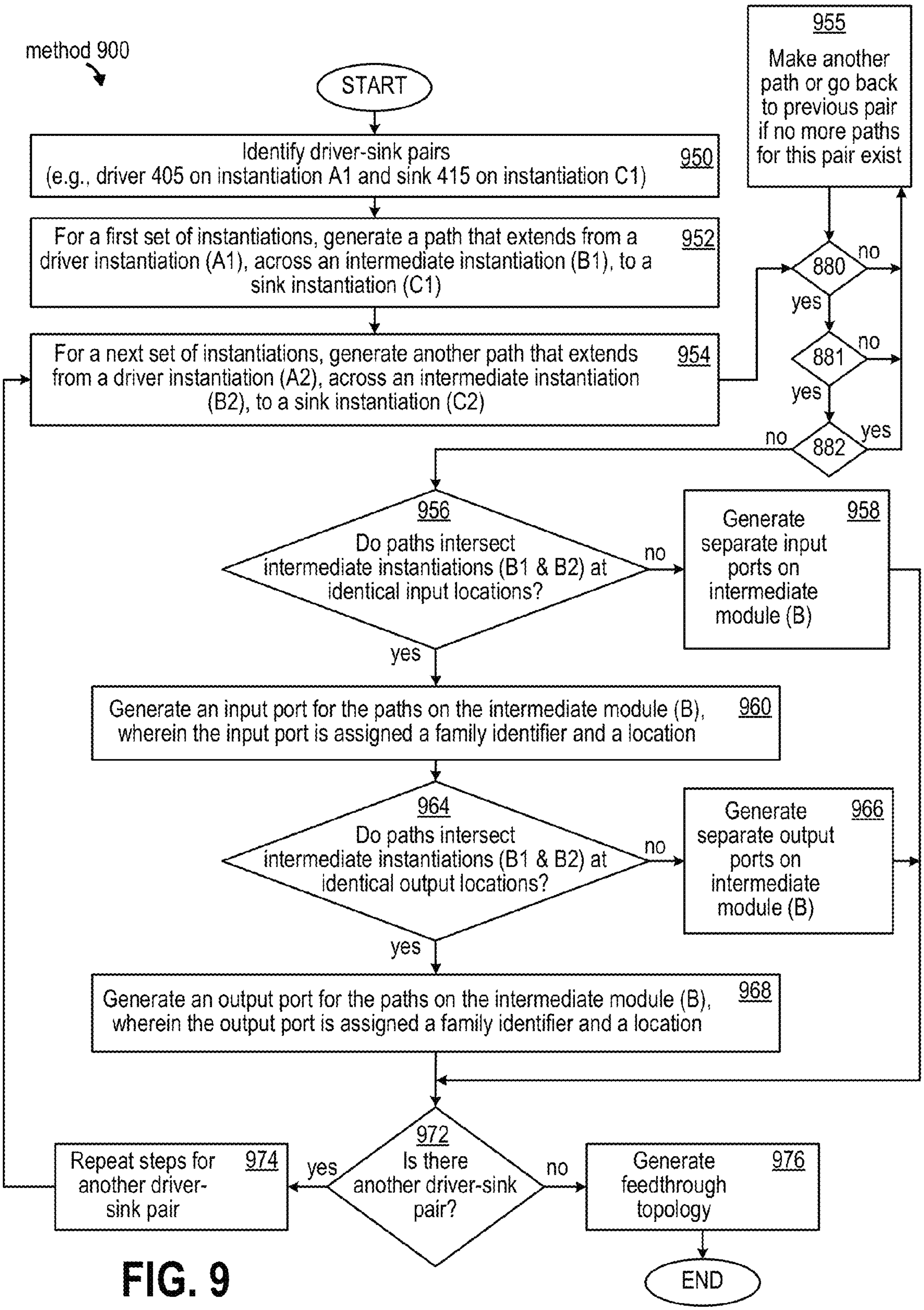
FIG. 9 is a flowchart of another example method for planning feedthrough ports on an integrated circuit (IC) floorplan.

FIG. 9 is a flowchart of another example method 900 for planning feedthrough ports on an integrated circuit (IC) floorplan. In one embodiment, the computer system 100 of FIGS. 1A-1B can carry out the operations of the method 900.

At action 950, the system identifies driver-sink pairs on the floorplan. For example, the system 100 identifies driver 405 on instantiation A1 paired with sink 415 on instantiation C1. The system 100 also identifies driver 425 on instantiation A2 paired with sink 435 on instantiation C2. The system may also identify a multitude of other driver-sink pairs on floorplan.

At action 952, for a first set of instantiations, the system generates a path that extends from a driver instantiation, across an intermediate instantiation, to a sink instantiation. For example, the system extends a path 411 from the center of instantiation A1, through instantiation B1, and to the center of instantiation C1.

At action 954, for a next set of instantiations, the system generates a path that extends from a driver instantiation, across an intermediate instantiation, to a sink instantiation. For example, the system extends a path 413 from the center of instantiation A2, through instantiation B2, and to the center of instantiation C2.

The method 900 then moves to decision operations 880, 881, and 882, which are described above with reference to FIG. 8B. In FIG. 9, if the answer is no for decision operations 880, or if the answer is no for decision operation 881, or if the answer is yes for decision operation 882, then the method 900 moves to action 955 where the system generates another path for the current driver-sink pair or goes back to the previous driver-sink pair if no more paths exist for the current driver-sink pair. After action 955, the method 900 returns to decision operation 880 and continues from there.

If the answer to decision operation 880 is yes, and if the answer to decision operation 881 is yes, and if the answer to decision operation 882 is no, then the method 900 moves to decision operation 956. At decision operation 956, the system determines if the two paths cross the intermediate instantiations at an identical input location. For example, the system 100 determines if path 411 crosses a left boundary of instantiation B1 at the identical location that path 413 crosses the left boundary of instantiation B2. If the system determines the paths do not cross at an identical input location, then the method 900 moves to an action 958 where the system generates separate input ports on the intermediate module.

However, if the system determines the paths cross at an identical input location, then the method 900 moves to an action 960 where the system generates an input port for the paths on the intermediate module. The system assigns a family identifier and a location to the input port. For example, the system 100 generates input port 406 on intermediate module B. The system assigns a family identifier and a location to input port 406.

At decision operation 964, the system determines if the two paths cross the intermediate instantiations at an identical output location. For example, the system 100 determines if path 411 crosses a right boundary of instantiation B1 at the identical location that path 413 crosses the right boundary of instantiation B2. If the system determines the paths do not cross at an identical output location, then the method 900 moves to an action 966 where the system generates separate output ports on the intermediate module.

However, if the system determines the paths cross at an identical output location, then the method 900 moves to an action 968 where the system generates an output port for the paths on the intermediate module. The system assigns a family identifier and a location to the output port. For example, the system 100 generates output port 417 on intermediate module B. The system assigns a family identifier and a location to output port 417.

At decision operation 972, the system determines if there another driver-sink pair that the system needs to process. If the system determines there are other driver-sink pairs, then the method 900 moves to an action 974 where the system repeats actions 452-468 for another driver-sink pair. The method 900 may continue in this manner until all driver-sink pairs are processed. There may be a multitude of driver-sink pairs that the system needs to process.

However, if the system determines there are no other driver-sink pairs, then the method 900 moves to an action 976 where the system generates the feedthrough topology for the floor plan. For example, the system generates ports and nets (e.g., modifies HDL to include nets) for connecting to the ports. Every net that is connected to the same port on the intermediate module may be assigned the same family identifier, which is the family identifier that is assigned to that port. For example, a net generated on instantiation B1 for input port 416 may be assigned the same family identifier as a net generated on instantiation B2 for input port 416.

Other actions and/or details are discussed with reference to other figures and may be a part of the method 900, depending on the implementation. For example, as described above with reference to FIGS. 5A-5C, the system may "backtrack" in order to maintain port consistency across multiple instantiations. Also, as described above with reference to FIG. 7, the system tends to avoid "splitting" a driver's output port.

Computer Apparatus

FIG. 1A illustrates a computer system 100 for designing an integrated circuit 199. In accordance with the embodiments of the invention, the computer system 100 includes a central processing unit (CPU) 103 to execute instructions of a software program to display a graphical user interface (GUI) 101 on an output device 102 (e.g., a display device or monitor). The computer system 100 further includes at least one input device 104, such as a mouse or trackpad, to interact with the GUI 101. The input device 104 may be directly coupled to the CPU 103 or may couple the CPU through a second input device 106, such as a keyboard.

Figure 1B:
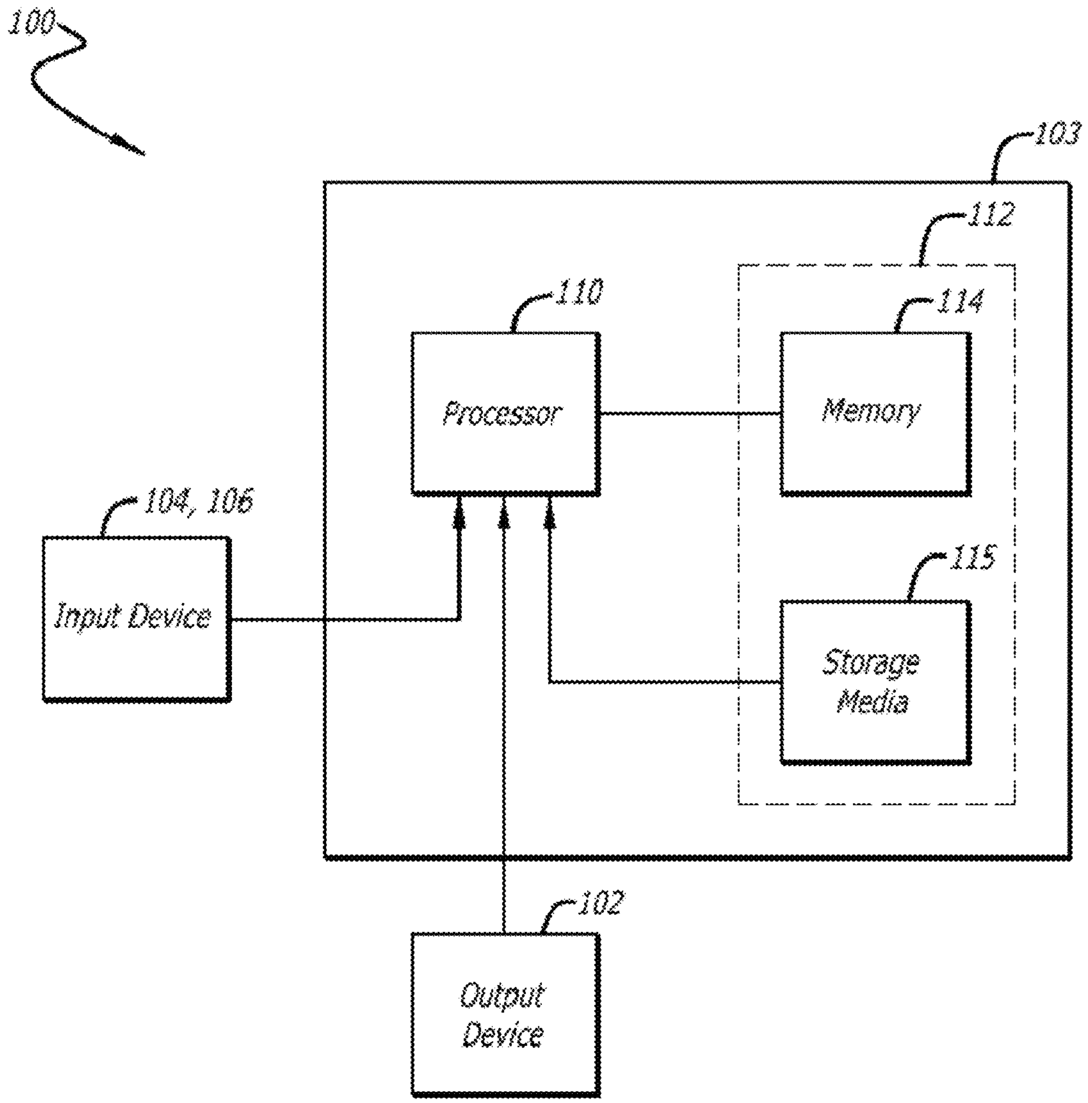
FIG. 1B illustrates a functional block diagram of the computer system to execute instructions of the software program and display the graphical user interface to a user for planning a floorplan of an integrated circuit.

FIG. 1B illustrates a functional block diagram of the computer system 100 to execute instructions of the software program and display the graphical user interface 101 to a user for planning a floorplan of an integrated circuit. The exemplary computing apparatus 100 is adapted to perform electronic computer aided design (ECAD) and may be used to execute instructions or code of software programs to perform the processes or elements of the methods disclosed herein. The computing apparatus 100 includes an input device 101, such as a keyboard, mouse, Ethernet or other communications port; an output device 102, such as a monitor, speakers, a printer, communications port, or a writeable media drive; a processor 110; and a storage device 112 coupled together as shown. The storage device 112 may include one or more of a memory 114, such as a volatile memory like RAM, SDRAM, DDR, DDR2, DDR3; and a storage media 115. The storage media 115 may comprise a non-volatile memory such as a hard drive, a solid-state drive, and the like. In some embodiments, as is known in the art, the storage media may be located on another computing device across a network (not shown). Instructions may be loaded from the storage media into the memory. The processor may retrieve instructions from the storage media or memory and execute the instructions to perform the operations described herein.

Included in the storage device 112 is a set of processor executable instructions that, when executed by the processor 110 configure the computing apparatus to provide the graphical user interface in a manner consistent with the methods disclosed herein. The user interface for planning and the layout windows shown in the Figures may be displayed on the output device 102, such as a monitor or a display device, in response to processor or machine readable instructions.

In one embodiment of the invention, the planning software for planning may be part of a logic synthesis software tool (e.g., the RTL Compiler tool) whose instructions are executed by the processor. In another embodiment of the invention, the planning software may be a standalone software tool with instructions that are executed independently by the processor.

The computing system includes a processor, a memory, a removable media drive, and a hard disk drive. The processor within the computer executes instructions stored in a machine-readable storage device such as the hard disk drive or a removable storage device (e.g., an optical medium (compact disk (CD), digital video disk (DVD), etc.), a magnetic medium (magnetic disk, a magnetic tape, etc.), or a combination of both.

When implemented in software, the elements of the embodiments of the invention are essentially the program, code segments, or instructions to perform the necessary tasks. The program, code segments, or instructions can be stored in a processor readable medium or storage device that can be read and executed by a processor. The processor readable medium may include any medium that can store information. Examples of the processor readable medium include an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc. and stored in the processor readable medium or storage device.

When implemented as an electronic computer aided design (ECAD) system, the elements of the embodiments of the invention include one or more processor to execute the program, code segments, or instructions that may be stored in a processor readable medium or storage device to perform the tasks or functions of a method or process. The one or more processors may be specifically adapted to electronic computer aided design including processing logic that may comprise hardware (e.g., circuitry, dedicated logic, etc.), software, or a combination of both.

Some portions of the preceding detailed description may have been presented in terms of algorithms and symbolic representations that perform operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities may take the form of electrical (e.g., current or voltage) or magnetic signals capable of being stored, transferred, combined, compared, and otherwise manipulated. It has proven convenient at times, principally for reasons of common usage, to refer to these signals as bits, values, levels, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, processing logic, or similar electronic computing device, that automatically or semi-automatically manipulates and transforms data represented as physical (electronic) quantities within the computer system's registers and memories into other data similarly represented as physical quantities within the computer system memories or registers or other such information storage, transmission or display devices.

Additionally, the embodiments of the invention are not described with reference to any particular programming language. It will be appreciated that a variety of programming languages may be used to implement the teachings of the embodiments of the invention as described herein.

CONCLUSION

A system, method, and apparatus for planning feedthrough ports for modules on a floorplan are described. The system groups paths (e.g., nets) into mutually exclusive families of paths (e.g., nets). The system tries out the simpler path combinations for each family. Advantageously, the system can find consistent design solutions for paths (e.g., nets), while adding fewer ports and fewer nets, within a practical amount of time.

It will be appreciated that the embodiments of the invention can be practiced by other means than that of the above-described embodiments, which are presented in this description for purposes of illustration and not of limitation. The specification and drawings are not intended to limit the exclusionary scope of this patent document. It is noted that various equivalents for the particular embodiments discussed in this description may be practice by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of generating design data for an integrated circuit, the method comprising:

identifying one or more driver-sink pairs on instantiations of modules, wherein the modules include a driver module, an intermediate module, and a sink module;

for a first set of instantiations, generating a first path that extends from a driver instantiation (A1), across an intermediate instantiation (B1), to a sink instantiation (C1);

for a second set of instantiations, generating a second path that extends from the driver instantiation (A2), across the intermediate instantiation (B2), to the sink instantiation (C2); and determining that the first path and the second path cross at an identical input location on the intermediate instantiations;

in response to the identical input location, generating a first input port on the intermediate module, wherein the first input port on the intermediate module is assigned a first family identifier and a first input port location, the first input port and the first input port location defining design data; and generating a photomask for the integrated circuit from the design data.

2. The method of claim 1, wherein the generating of the first input port is performed before physically designing at least one of the driver module, the intermediate module, or the sink module.

3. The method of claim 1, further comprising:

planning to connect a first output port of the driver module to the first input port on the intermediate module by way of a channel-less electrical connection.

4. The method of claim 1, further comprising:

for the first set of instantiations, generating a third path that extends from the driver module (A1), across a second intermediate module (D1), to a sink module (C1);

for the second set of instantiations, generating a fourth path that extends from the driver module (A2), across the second intermediate module (D2), to the sink module (C2);

determining that the third path or the fourth path is associated with a routing blockage; and in response to the routing blockage, deciding not to use the third path or the fourth path for the floorplan.

5. The method of claim 4, further comprising:

backtracking to continue using the first path and the second path for the floorplan, instead using of the third path and the fourth path for the floorplan.

6. A system for generating design data for an integrated circuit, the system comprising:

a processor to execute instructions; and a storage device coupled to the processor, the storage device storing instructions for execution by the processor to cause the processor to perform:

identifying one or more driver-sink pairs on instantiations of modules, wherein the modules include a driver module, an intermediate module, and a sink module;

for a first set of instantiations, generating a first path that extends from a driver instantiation (A1), across an intermediate instantiation (B1), to a sink instantiation (C1);

for a second set of instantiations, generating a second path that extends from the driver instantiation (A2), across the intermediate instantiation (B2), to the sink instantiation (C2);

determining that the first path and the second path cross at an identical input location on the intermediate instantiations;

in response to the identical input location, generating a first input port on the intermediate module, wherein the first input port on the intermediate module is assigned a first family identifier and a first input port location, the first input port and the first input port location defining design data; and generating a photomask for the integrated circuit from the design data.

7. The system of claim 6, wherein:

the first path is represented by a first air-line; and the second path is represented by a second air-line.

8. The system of claim 6, wherein:

for the first set of a instantiations, the first path extends from a center of the driver instantiation (A1) to a center of the sink instantiation (C1); and for the second set of instantiations, the second path extends from a center of the driver instantiation (A2) to a center of the sink instantiation (C2).

9. The system of claim 6, wherein the storage device stores further instructions for execution by the processor to cause the processor to perform:

determining that the first path and the second path cross at an identical output location on the intermediate instantiations; and in response to the identical output location, generating an output port on the intermediate module, wherein the output port on the intermediate module is assigned the first family identifier and a first output port location.

10. The system of claim 9, wherein the storage device stores further instructions for execution by the processor to cause the processor to perform:

generating a first feedthrough buffer for the intermediate module, wherein the first feedthrough buffer extends from the first input port on the intermediate module to the first output port on the intermediate module.

11. The system of claim 9, wherein the storage device stores further instructions or execution by the processor to cause the processor to perform:

planning for the first feedthrough buffer to be physically identical on all instantiations of the intermediate module; and assigning a different identifier to the first feedthrough buffer for each instantiation of the intermediate module.

12. The system of claim 6, wherein the storage device stores further instructions for execution by the processor to cause the processor to perform:

determining that the first path and the second path cross at different output locations on the intermediate module (B1) and the intermediate module (B2); and generating different output ports for the different output locations on the intermediate module.

13. The system of claim 6, wherein the generating the first input port further comprises:

modifying a hardware description language (HDL) of a netlist of the floorplan.

14. The system of claim 6, wherein the generating of the first input port is performed before physically designing at least one of the driver module, the intermediate module, or the sink module.

15. The system of claim 6, wherein the storage device stores further instructions for execution by the processor to cause the processor to perform:

planning to connect a first output port of the driver module to the first input port on the intermediate module by way of a channel-less electrical connection.

16. The system of claim 6, wherein the storage device stores further instructions for execution by the processor to cause the processor to perform:

for the first set of instantiations, generating a third path that extends from the driver module (A1), across a second intermediate module (D1), to a sink module (C1);

for the second set of instantiations, generating a fourth path that extends from the driver module (A2), across the second intermediate module (D2), to the sink module (C2);

determining that the third path or the fourth path is associated with a routing blockage; and in response to the routing blockage, deciding not to use the third path or the fourth path for the floorplan.

17. The system of claim 16, wherein the storage device stores further instructions for execution by the processor to cause the processor to perform:

backtracking to continue using the first path and the second path for the floorplan, instead using of the third path and the fourth path for the floorplan.

18. The system of claim 6, wherein the storage device stores further instructions for execution by the processor to cause the processor to perform:

for a third set of instantiations, determining that a path combination between a driver and two different sinks requires an output port of the driver to be split; and deciding not to use the path combination that requires the output port of the driver to be split.

19. A computer-readable product for generating design data for an integrated circuit, the computer-readable product including a non-transitory computer-readable storage medium storing instructions comprising:

identifying one or more driver-sink pairs on instantiations of modules, wherein the modules include a driver module, an intermediate module, and a sink module;

for a first set of instantiations, generating a first path that extends from a driver instantiation (A1), across an intermediate instantiation (B1), to a sink instantiation (C1);

for a second set of instantiations, generating a second path that extends from the driver instantiation (A2), across the intermediate instantiation (B2), to the sink instantiation (C2);

determining that the first path and the second path cross at an identical input location on the intermediate instantiations;

in response to the identical input location, generating a first input port on the intermediate module, wherein the first input port on the intermediate module is assigned a first family identifier and a first input port location, the first input port and the first input port location defining design data; and generating a photomask for the integrated circuit from the design data.

20. The computer-readable product of claim 19, wherein the instructions stored on the storage device further comprise:

determining that the first path and the second path cross at an identical output location on the intermediate instantiations; and in response to the identical output location, generating an output port on the intermediate module, wherein the output port on the intermediate module is assigned the first family identifier and a first output port location.

* * * * *